US011201663B2

(12) United States Patent
Zhou et al.

(10) Patent No.: US 11,201,663 B2
(45) Date of Patent: Dec. 14, 2021

(54) TRANSMISSION CONFIGURATION INDICATION DETERMINATION FOR A SHARED DATA CHANNEL

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 16/719,785

(22) Filed: Dec. 18, 2019

(65) Prior Publication Data

US 2020/0204246 A1 Jun. 25, 2020

Related U.S. Application Data

(60) Provisional application No. 62/783,084, filed on Dec. 20, 2018.

(51) Int. Cl.
*H04B 7/08* (2006.01)
*H04W 72/04* (2009.01)
*H04W 74/08* (2009.01)

(52) U.S. Cl.
CPC ............ *H04B 7/088* (2013.01); *H04B 7/086* (2013.01); *H04W 72/042* (2013.01); *H04W 72/044* (2013.01); *H04W 74/0833* (2013.01)

(58) Field of Classification Search
None
See application file for complete search history.

(56) References Cited

U.S. PATENT DOCUMENTS 10,651,917 B2 * 5/2020 Wilson et al. ...... H04W 72/046
10,849,187 B2 * 11/2020 Tsai .................... H04W 72/042
(Continued)

FOREIGN PATENT DOCUMENTS

| CN | 109587793 A | 4/2019 |
|---|---|---|
| WO | WO2019095893 A1 | 5/2019 |
| WO | WO2019097478 A1 | 5/2019 |

OTHER PUBLICATIONS

ETRI: "PDCCH Design for Multi-Beam Operation", 3GPP TSG RAN WG1 Meeting #91, 3GPP Draft; R1-1720231 PDCCH Design for Multi-Beam Operation—Final, 3rd Generation Partnership Project (3GPP), Mobile Competence Centre; 650, Route Des Lucioles; F-06921 Sophia-Antipolis Cedex ; France, vol. RAN WG1, No. Reno, USA; Nov. 27, 2017-Dec. 1, 2017, Nov. 18, 2017 (Nov. 18, 2017), pp. 1-6, XP051369867, Retrieved from the Internet: URL: http://www.3gpp.org/ftp/tsg%5Fran/WG1%5FRL1/TSGR1%5F91/Docs/ [retrieved on Nov. 18, 2017] Sections 1, 2.1 and 2.2 and proposal 2; figures 3.4; table 1.

(Continued)

*Primary Examiner* — Ayaz R Sheikh
*Assistant Examiner* — Faiyazkhan Ghafoerkhan
(74) *Attorney, Agent, or Firm* — Danai Nelisile Mhembere; Holland & Hart LLP

(57) ABSTRACT

Methods, systems, and devices for wireless communications are described. A user equipment (UE) may receive signaling configuring a first active transmission configuration indication (TCI) state for an initial control resource set and a second active TCI state for a second control resource set. The UE may monitor the initial control resource set using a first beam corresponding to the first active TCI state, the second control resource set using a second beam corresponding to the second active TCI state, and a shared data channel using one of the two beams. The UE may perform a random access channel procedure to select a third beam (Continued)

and update a quasi co-location assumption for the initial control resource set to correspond to the third beam. The UE may apply a selection rule for selecting between the second beam and the third beam and monitor the shared data channel using the selected beam.

30 Claims, 17 Drawing Sheets

(56) References Cited

U.S. PATENT DOCUMENTS

| | | | | |
|---|---|---|---|---|
| 2019/0140776 | A1* | 5/2019 | Seo | H04B 7/0482 |
| 2019/0215701 | A1* | 7/2019 | Honglei | H04W 24/02 |
| 2019/0222289 | A1* | 7/2019 | Wilson et al. | H04L 5/0073 |
| 2019/0253904 | A1* | 8/2019 | Tsai | H04L 5/0094 |
| 2019/0254120 | A1* | 8/2019 | Zhang | H04W 24/08 |
| 2019/0313445 | A1* | 10/2019 | Tsai | H04L 5/0094 |
| 2020/0014510 | A1* | 1/2020 | Wu | H04L 5/0005 |
| 2020/0053580 | A1* | 2/2020 | Bagheri | H04L 5/0051 |
| 2020/0196383 | A1* | 6/2020 | Tsai | H04L 5/0092 |
| 2020/0204247 | A1* | 6/2020 | Zhou | H04B 7/0628 |
| 2020/0288479 | A1* | 9/2020 | Xi | H04B 7/02 |
| 2020/0336928 | A1* | 10/2020 | Seo | H04W 72/042 |
| 2020/0374060 | A1* | 11/2020 | Wang | H04B 7/024 |
| 2021/0014884 | A1* | 1/2021 | Yang | H04W 72/046 |
| 2021/0051700 | A1* | 2/2021 | Liou | H04L 5/0053 |
| 2021/0105860 | A1* | 4/2021 | Tsai | H04L 5/0044 |
| 2021/0212082 | A1* | 7/2021 | Wang | H04B 7/0695 |

OTHER PUBLICATIONS

International Search Report and Written Opinion—PCT/US2019/067404—ISA/EPO—Apr. 22, 2020.
NTT Docomo., et al., "Maintenance for NR Random Access", 3GPP Draft, R1-1811381, Maintenance for NR Random Access Final, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 29, 2018 (Sep. 29, 2018), XP051518785, 5 pages, Retrieved from the Internet: URL: http://www.3gpp.org/ftp/tsg%5Fran/WG1%5FRL1/TSGR1%5F94b/Docs/R1%2D1811381%2Ezip. [retrieved on Sep. 29, 2018] section 2.2.1, "Proposal 4".
QUALCOMM Incorporated: "Discussion on QCL", 3GPP Draft, 3GPP TSG RAN WG1 Meeting 90bis, R1-1718551, 3rd Generation Partnership Project (3GPP), Mobile Competence Centre, 650, Route Des Lucioles, F-06921 Sophia-Antipolis Cedex, France, vol. RAN WG1, No. Prague, Czech, Oct. 9, 2017-Oct. 13, 2017, Oct. 8, 2017 (Oct. 8, 2017), XP051341732, 9 Pages, Retrieved from the Internet: URL: https://www.3gpp.org/ftp/Meetings_3GPP_SYNC/RAN1/Docs/ [retrieved on Oct. 3, 2017], section 2.1;figure (a).
SAMSUNG: "On Beam Indication", 3GPP Draft, 3GPP TSG RAN WG1 Meeting 90bis, R1-1717627 on Beam Indication_V1, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051340813, 9 Pages, Retrieved from the Internet: URL:http://www.3gpp.org/ftp/Meetings_3GPP_SYNC/RAN1/Docs/ [retrieved on Oct. 8, 2017].
U.S. Appl. No. 62/783,084, filed Dec. 20, 2018, 105 pages.

* cited by examiner

TRANSMISSION CONFIGURATION INDICATION DETERMINATION FOR A SHARED DATA CHANNEL

CROSS REFERENCE

The present Application for Patent claims the benefit of U.S. Provisional Patent Application No. 62/783,084 by ZHOU, et al., entitled "TRANSMISSION CONFIGURATION INDICATION DETERMINATION FOR A SHARED DATA CHANNEL," filed Dec. 20, 2018, assigned to the assignee hereof, and expressly incorporated herein.

BACKGROUND

The following relates generally to wireless communications, and more specifically to transmission configuration indication determination for a shared data channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). In some wireless communications systems, a base station and a UE may exchange control information and data on one or more beams. In some cases, the UE may be configured to use a limited number of active receive beams. Conventional techniques for managing the active receive beams at the UE may be deficient.

SUMMARY

The described techniques relate to improved methods, systems, devices, and apparatuses that support transmission configuration indication determination for a shared data channel. In some wireless communications systems, a UE and a base station may use beamformed communications, and the UE and base station may identify a suitable transmit and receive beam pair for communicating data and control information. The base station may configure a downlink receive beam at the UE by transmitting an indication of a transmission configuration indication (TCI) to the UE. The TCI may include a quasi co-location (QCL) reference that indicates to the UE which receive beam to select that corresponds to a downlink transmit beam being used by the base station for downlink transmissions. For example, the QCL reference may indicate spatial characteristics of the base station transmit beam such that the UE can select a corresponding receive beam. The QCL reference may indicate a relationship between a reference signal and the scheduled downlink transmission, and the UE may assume channel characteristics for the downlink transmission based on the reference signal. The UE may determine the spatial characteristics (e.g., direction), Doppler spread, Doppler shift, average delay, and average spread, or any combination thereof, for the downlink transmission based on the QCL reference indicated in the received TCI state.

In some cases, the UE may be configured with one or more TCI state configurations. Different TCI states, distinguished by different values of the TCI, may correspond to QCL relationships with different reference signal transmissions. By configuring the TCI states at the UE, the base station can dynamically select beams for downlink transmission to the UE, and the UE can select the corresponding receive beam to receive the downlink transmission. In some cases, the number of active TCI states configured at the UE may be limited based on UE capability. The UE may report its capability for a number of active TCI states to the base station, and the base station may configure that many active QCL assumptions for downlink control and data transmissions. By limiting the number of active beams, the complexity at a UE associated with identifying a beam for communicating with a base station may be reduced.

There may be situations where the QCL assumption for a control resource set is updated. For example, during a random access channel procedure, the base station may transmit multiple reference signals on different beams during the random access channel procedure, and the UE may transmit a random access channel preamble indicating the beam with the strongest reference signal. Upon indicating the downlink beam, the QCL assumption for the control resource set may be updated based on the indicated downlink beam. The base station may transmit a random access channel response message on the downlink beam in response to receiving the random access channel preamble.

In an example, the UE may be capable of supporting two active QCL assumptions for control signaling and one active QCL assumption for data. In some examples, the UE may support at most two downlink receive beams and reuse one of the active control TCI states for the active data TCI state (e.g., data and control signaling share a downlink receive beam). When the UE changes the QCL assumption for one of the active control TCI states, the UE may have options for how to assign the active data TCI state. For example, if a first active control TCI state is reused by the active data TCI state, and the QCL assumption for the first active control TCI state is changed by the random access procedure, the UE may have the option of having the active data TCI state reuse the first active control TCI state or reuse the second active TCI state (e.g., which was not updated). Therefore, a UE as described herein with the capability of supporting two control channel QCL assumptions and one data channel QCL assumption may implement techniques for determining which active control TCI state the active data TCI state should reuse after a QCL assumption for one of the two active control TCI states is changed.

A method of wireless communication by a UE is described. The method may include receiving configuration signaling configuring a first active transmission configuration indication state for an initial control resource set and a second active transmission configuration indication state for a second control resource set, monitoring the initial control resource set using a first beam corresponding to the first active transmission configuration indication state, the second control resource set using a second beam corresponding to the second active transmission configuration indication state, and a shared data channel using one of the first beam or the second beam, performing a random access channel procedure to select a third beam from a set of different beams, updating a quasi co-location assumption for the initial control resource set to correspond to the third beam, applying a selection rule for selecting between the second beam and the third beam, and monitoring the shared data channel using the selected beam.

An apparatus for wireless communication by a UE is described. The apparatus may include a processor, memory in electronic communication with the processor, and instructions stored in the memory. The instructions may be executable by the processor to cause the apparatus to receive configuration signaling configuring a first active transmission configuration indication state for an initial control resource set and a second active transmission configuration indication state for a second control resource set, monitor the initial control resource set using a first beam corresponding to the first active transmission configuration indication state, the second control resource set using a second beam corresponding to the second active transmission configuration indication state, and a shared data channel using one of the first beam or the second beam, perform a random access channel procedure to select a third beam from a set of different beams, update a quasi co-location assumption for the initial control resource set to correspond to the third beam, apply a selection rule for selecting between the second beam and the third beam, and monitor the shared data channel using the selected beam.

Another apparatus for wireless communication by a UE is described. The apparatus may include means for receiving configuration signaling configuring a first active transmission configuration indication state for an initial control resource set and a second active transmission configuration indication state for a second control resource set, monitoring the initial control resource set using a first beam corresponding to the first active transmission configuration indication state, the second control resource set using a second beam corresponding to the second active transmission configuration indication state, and a shared data channel using one of the first beam or the second beam, performing a random access channel procedure to select a third beam from a set of different beams, updating a quasi co-location assumption for the initial control resource set to correspond to the third beam, applying a selection rule for selecting between the second beam and the third beam, and monitoring the shared data channel using the selected beam.

A non-transitory computer-readable medium storing code for wireless communication by a UE is described. The code may include instructions executable by a processor to receive configuration signaling configuring a first active transmission configuration indication state for an initial control resource set and a second active transmission configuration indication state for a second control resource set, monitor the initial control resource set using a first beam corresponding to the first active transmission configuration indication state, the second control resource set using a second beam corresponding to the second active transmission configuration indication state, and a shared data channel using one of the first beam or the second beam, perform a random access channel procedure to select a third beam from a set of different beams, update a quasi co-location assumption for the initial control resource set to correspond to the third beam, apply a selection rule for selecting between the second beam and the third beam, and monitor the shared data channel using the selected beam.

In some examples of the method, apparatuses, and non-transitory computer-readable medium described herein, the selection rule indicates to select the third beam based on an active transmission configuration indication state for the shared data channel following the first active transmission configuration indication state for the initial control resource set prior to updating the quasi co-location assumption.

In some examples of the method, apparatuses, and non-transitory computer-readable medium described herein, applying the selection rule further may include operations, features, means, or instructions for selecting the third beam by configuring a quasi co-location assumption for the shared data channel to follow the updated quasi co-location assumption for the initial control resource set.

Some examples of the method, apparatuses, and non-transitory computer-readable medium described herein may further include operations, features, means, or instructions for receiving second configuration signaling configuring a third active transmission configuration indication state for the initial control resource set, and monitoring the initial control resource set, the shared data channel, or both, using a fourth beam that corresponds to the third active transmission configuration indication state.

In some examples of the method, apparatuses, and non-transitory computer-readable medium described herein, receiving the configuration signaling further may include operations, features, means, or instructions for receiving a medium access control (MAC) control element (CE) indicating to apply the first active transmission configuration indication state or the second active transmission configuration indication state as an active transmission configuration indication state for the shared data channel.

In some examples of the method, apparatuses, and non-transitory computer-readable medium described herein, applying the selection rule further may include operations, features, means, or instructions for selecting the second beam by updating an active transmission configuration indication state for the shared data channel to follow the second active transmission configuration indication state for the second control resource set.

In some examples of the method, apparatuses, and non-transitory computer-readable medium described herein, the selection rule indicates to select the second beam based on an active transmission configuration indication state for the shared data channel following the first active transmission configuration indication state for the initial control resource set prior to updating the quasi co-location assumption.

In some examples of the method, apparatuses, and non-transitory computer-readable medium described herein, applying the selection rule further may include operations, features, means, or instructions for selecting the second beam by updating an active transmission configuration indication state for the shared data channel to follow the second active transmission configuration indication state for the second control resource set.

Some examples of the method, apparatuses, and non-transitory computer-readable medium described herein may further include operations, features, means, or instructions for receiving second configuration signaling configuring a third active transmission configuration indication state for the initial control resource set.

Some examples of the method, apparatuses, and non-transitory computer-readable medium described herein may further include operations, features, means, or instructions for monitoring the initial control resource set, the shared data channel, or both, using a fourth beam that corresponds to the third active transmission configuration indication state.

Some examples of the method, apparatuses, and non-transitory computer-readable medium described herein may further include operations, features, means, or instructions for monitoring the initial control resource set using a fourth beam that corresponds to the third active transmission configuration indication state, where monitoring of the shared data channel uses the second beam.

Some examples of the method, apparatuses, and non-transitory computer-readable medium described herein may further include operations, features, means, or instructions for receiving control signaling that configures the selection rule.

In some examples of the method, apparatuses, and non-transitory computer-readable medium described herein, receiving the configuration signaling further may include operations, features, means, or instructions for receiving the configuration signaling that indicates an active transmission configuration indication state for the shared data channel may be to follow the first active transmission configuration indication state for the initial control resource set.

In some examples of the method, apparatuses, and non-transitory computer-readable medium described herein, receiving the configuration signaling further may include operations, features, means, or instructions for receiving the configuration signaling that indicates that an active transmission configuration indication state for the shared data channel may be to follow the second active transmission configuration indication state for the second control resource set.

Some examples of the method, apparatuses, and non-transitory computer-readable medium described herein may further include operations, features, means, or instructions for transmitting capability signaling indicating that the UE supports two active transmission configuration indication states, where the configuration signaling may be based on the support signaling.

In some examples of the method, apparatuses, and non-transitory computer-readable medium described herein both of the two active transmission configuration indication states may be configured to be used for a downlink control channel, and one of the two active transmission configuration indication states may be configured to be used for a downlink shared data channel.

In some examples of the method, apparatuses, and non-transitory computer-readable medium described herein, performing the random access channel procedure to select the third beam further may include operations, features, means, or instructions for generating a set of reference signal measurements that each correspond to a respective beam of the set of different beams, and selecting the third beam based on the set of reference signal measurements.

A method of wireless communication by a base station is described. The method may include transmitting configuration signaling configuring a UE with a first active transmission configuration indication state corresponding to a first beam for an initial control resource set and a second active transmission configuration indication state corresponding to a second beam for a second control resource set, performing a random access channel procedure to select a third beam from a set of different beams, updating a quasi co-location assumption for the initial control resource set to correspond to the third beam, applying a selection rule for selecting between the second beam and the third beam, and transmitting a data transmission within a shared data channel using the selected beam.

An apparatus for wireless communication by a base station is described. The apparatus may include a processor, memory in electronic communication with the processor, and instructions stored in the memory. The instructions may be executable by the processor to cause the apparatus to transmit configuration signaling configuring a UE with a first active transmission configuration indication state corresponding to a first beam for an initial control resource set and a second active transmission configuration indication state corresponding to a second beam for a second control resource set, perform a random access channel procedure to select a third beam from a set of different beams, update a quasi co-location assumption for the initial control resource set to correspond to the third beam, apply a selection rule for selecting between the second beam and the third beam, and transmit a data transmission within a shared data channel using the selected beam.

Another apparatus for wireless communication by a base station is described. The apparatus may include means for transmitting configuration signaling configuring a UE with a first active transmission configuration indication state corresponding to a first beam for an initial control resource set and a second active transmission configuration indication state corresponding to a second beam for a second control resource set, performing a random access channel procedure to select a third beam from a set of different beams, updating a quasi co-location assumption for the initial control resource set to correspond to the third beam, applying a selection rule for selecting between the second beam and the third beam, and transmitting a data transmission within a shared data channel using the selected beam.

A non-transitory computer-readable medium storing code for wireless communication by a base station is described. The code may include instructions executable by a processor to transmit configuration signaling configuring a UE with a first active transmission configuration indication state corresponding to a first beam for an initial control resource set and a second active transmission configuration indication state corresponding to a second beam for a second control resource set, perform a random access channel procedure to select a third beam from a set of different beams, update a quasi co-location assumption for the initial control resource set to correspond to the third beam, apply a selection rule for selecting between the second beam and the third beam, and transmit a data transmission within a shared data channel using the selected beam.

In some examples of the method, apparatuses, and non-transitory computer-readable medium described herein, the selection rule indicates to select the third beam based on an active transmission configuration indication state for the shared data channel following the first active transmission configuration indication state for the initial control resource set prior to updating the quasi co-location assumption.

In some examples of the method, apparatuses, and non-transitory computer-readable medium described herein, applying the selection rule further may include operations, features, means, or instructions for selecting the third beam by configuring a quasi co-location assumption for the shared data channel to follow the updated quasi co-location assumption for the initial control resource set.

Some examples of the method, apparatuses, and non-transitory computer-readable medium described herein may further include operations, features, means, or instructions for transmitting second configuration signaling configuring a third active transmission configuration indication state for the initial control resource set, and transmitting a transmission within the initial control resource set or the shared data channel using a fourth beam that corresponds to the third active transmission configuration indication state.

In some examples of the method, apparatuses, and non-transitory computer-readable medium described herein, transmitting the configuration signaling further may include operations, features, means, or instructions for transmitting a medium access control (MAC) control element (CE) indicating to apply the first active transmission configuration indication state or the second active transmission configuration indication state as an active transmission configuration indication state for the shared data channel.

In some examples of the method, apparatuses, and non-transitory computer-readable medium described herein, applying the selection rule further may include operations, features, means, or instructions for selecting the second beam by updating an active transmission configuration indication state for the shared data channel to follow the second active transmission configuration indication state for the second control resource set.

In some examples of the method, apparatuses, and non-transitory computer-readable medium described herein, the selection rule indicates to select the second beam based on an active transmission configuration indication state for the shared data channel following the first active transmission configuration indication state for the initial control resource set prior to updating the quasi co-location assumption.

In some examples of the method, apparatuses, and non-transitory computer-readable medium described herein, applying the selection rule further may include operations, features, means, or instructions for selecting the second beam by updating an active transmission configuration indication state for the shared data channel to follow the second active transmission configuration indication state for the second control resource set.

Some examples of the method, apparatuses, and non-transitory computer-readable medium described herein may further include operations, features, means, or instructions for transmitting second configuration signaling configuring a third active transmission configuration indication state for the initial control resource set.

Some examples of the method, apparatuses, and non-transitory computer-readable medium described herein may further include operations, features, means, or instructions for transmitting a transmission within the initial control resource set or the shared data channel using a fourth beam that corresponds to the third active transmission configuration indication state.

Some examples of the method, apparatuses, and non-transitory computer-readable medium described herein may further include operations, features, means, or instructions for transmitting a transmission within the initial control resource set using a fourth beam that corresponds to the third active transmission configuration indication state, where the data transmission may be transmitted using the second beam.

Some examples of the method, apparatuses, and non-transitory computer-readable medium described herein may further include operations, features, means, or instructions for transmitting control signaling that configures the selection rule.

In some examples of the method, apparatuses, and non-transitory computer-readable medium described herein, transmitting the configuration signaling further may include operations, features, means, or instructions for transmitting the configuration signaling that indicates an active transmission configuration indication state for the shared data channel may be to follow the first active transmission configuration indication state for the initial control resource set.

In some examples of the method, apparatuses, and non-transitory computer-readable medium described herein, transmitting the configuration signaling further may include operations, features, means, or instructions for transmitting the configuration signaling that indicates that an active transmission configuration indication state for the shared data channel may be to follow the second active transmission configuration indication state for the second control resource set.

Some examples of the method, apparatuses, and non-transitory computer-readable medium described herein may further include operations, features, means, or instructions for receiving support capability indicating that the UE supports two active transmission configuration indication states, where the configuration signaling may be based on the support signaling.

In some examples of the method, apparatuses, and non-transitory computer-readable medium described herein, both of the two active transmission configuration indication states may be configured to be used for a downlink control channel, and one of the two active transmission configuration indication states may be configured to be used for a downlink shared data channel.

Some examples of the method, apparatuses, and non-transitory computer-readable medium described herein may further include operations, features, means, or instructions for configuring, based on applying the selection rule for selecting between the second beam and the third beam, a receiver or a transmitter to use the selected beam.

DETAILED DESCRIPTION

Figure 1:
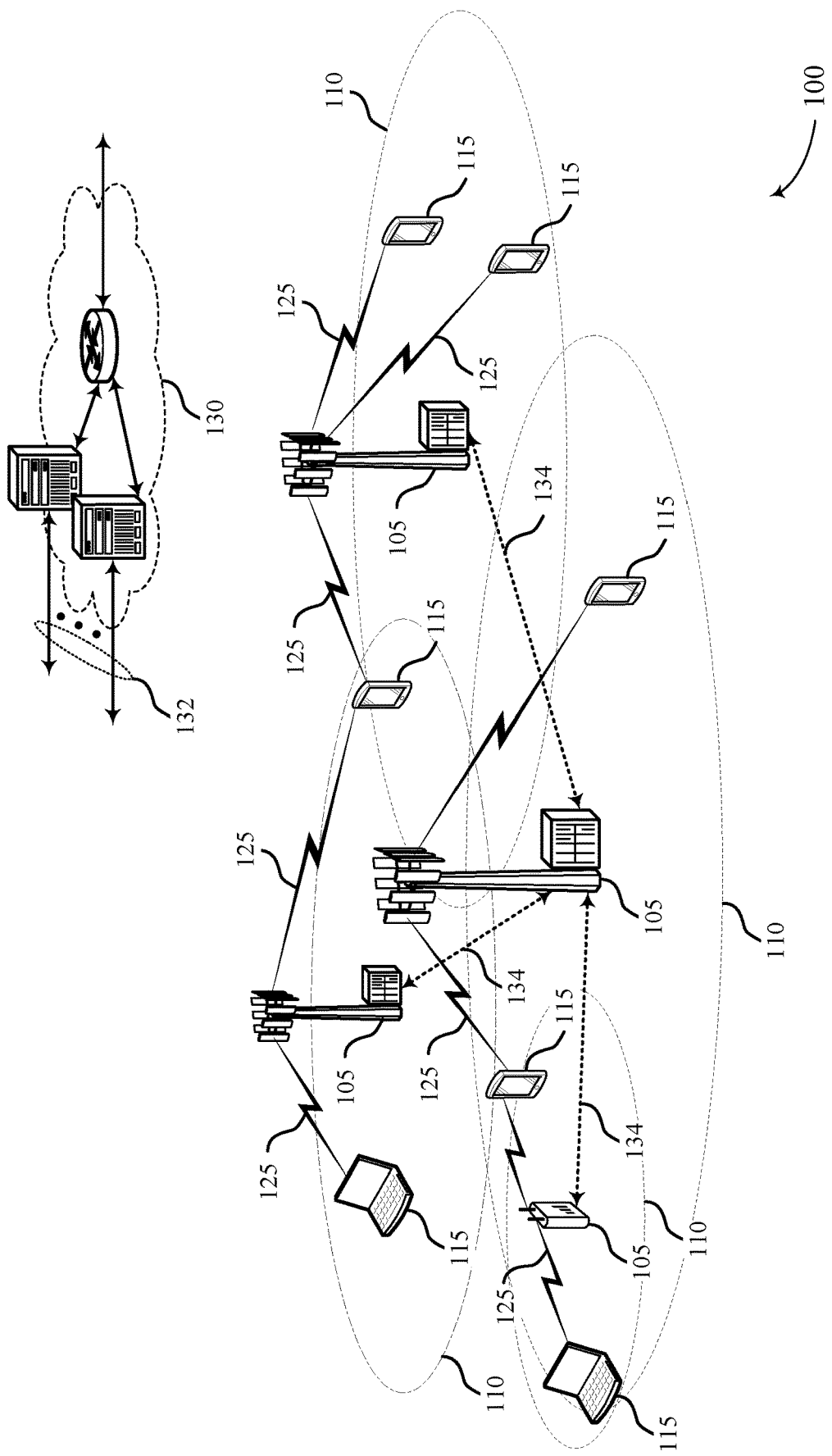
FIG. 1 illustrates an example of a system for wireless communications that supports transmission configuration indication determination for a shared data channel in accordance with aspects of the present disclosure.

In some wireless communications systems, a user equipment (UE) and a base station may use beamformed communications. For example, the base station may directionally transmit or receive using one or more beams (e.g., base station beams), and the UE may directionally receive or transmit using one or more beams (e.g., UE beams). In such systems, the UE may identify a suitable beam for communicating data and control information with the base station. For example, to configure a receive beam at the UE, the base station may transmit an indication of a transmission configuration indication (TCI) to the UE which includes a quasi co-location (QCL) reference that assists the UE in selecting the receive beam. The QCL reference may indicate a relationship between a previously transmitted reference signal and the scheduled downlink transmission. The QCL relationship may indicate to the UE that the demodulation reference signals of the scheduled downlink transmission are quasi co-located to the previously transmitted reference signal, and the UE can assume the same channel when receiving the schedule downlink transmission as the previously transmitted reference signal. Examples of previously transmitted reference signals may include reference signals transmitted in a synchronizations signal block (SSB), a channel state indicator reference signal (CSI-RS), reference signals transmitted during a random access procedure, etc.

The UE may determine the spatial characteristics (e.g., direction), Doppler spread, Doppler shift, average delay, and average spread, or any combination thereof, for the downlink transmission based on the QCL relationship to the indicated TCI state, and the UE may select a receive beam accordingly. In some cases, the UE may select a base station beam and UE beam (e.g., a beam link pair) and transmit an indication of the beam link pair to the base station. For beam selection via control signaling, the base station may identify a beam pair and configure the UE with a beam via downlink control information (DCI) or a Medium Access Control (MAC) control element (MAC CE).

The UE may be configured with one or more TCI state configurations. Different TCI states, distinguished by different values of the TCI, may correspond to QCL relationships with different reference signal transmissions. For example, each TCI state may be associated with one of the previously received reference signals. The TCI state may provide a spatial QCL reference that the UE can use to set the receive beam. By configuring the TCI states at the UE, the base station can dynamically select beams for downlink transmission to the UE, and the UE can select the corresponding receive beam to receive the downlink transmission. For a downlink transmission, the base station may transmit an indication of the TCI state to the UE, and the UE may select the corresponding receive beam based on the indicated TCI state to receive the downlink transmission. The TCI states may be configured via higher layer signaling.

In some cases, the number of active TCI states configured at the UE may be limited based on UE capability. The UE may report its capability for a number of active TCI states to the base station, and the base station may configure that many active QCL assumptions for downlink control and data transmissions. As TCI states correspond to receive beams, if the number of active TCI states is limited at the UE, the number of active downlink receive beams may also be limited. If, for example, the UE indicates one active TCI state, then downlink data and control transmissions may share a single downlink beam. If the UE indicates two active TCI states for control and one active TCI state for data, then the active data TCI state may reuse a downlink receive beam of one of the active control TCI states. By limiting the number of active beams, the complexity at a UE associated with identifying a beam for communicating with a base station may be reduced. In some cases, however, a UE may identify additional active beams (e.g., different from the beams indicated by the TCI states) available for communicating with a base station based on QCL assumptions.

There may be situations where the QCL assumption for a control resource set is updated. For example, a QCL assumption for a common control resource set associated with handover and cell management (e.g., control resource set 0) may be updated after the UE performs a random access channel procedure. The base station may transmit multiple reference signals on different beams during the random access channel procedure, and the UE may transmit a random access channel preamble indicating the beam with the strongest reference signal. Upon indicating the downlink beam, the QCL assumption for control resource set 0 may be updated to the indicated downlink beam. Thus, the base station may transmit a random access channel response message on the downlink beam in response to receiving the random access channel preamble.

In an example, the UE may indicate its capability of supporting two active QCL assumptions for control signaling and one active QCL assumption for data. The UE may support at most two downlink receive beams and reuse one of the active control TCI states for the active data TCI state (e.g., data and control signaling share a downlink receive beam). One of the two active control TCI states may be used for control resource set 0, which is updated after performing the random access channel procedure to the downlink beam indicated in the random access channel procedure. When the UE changes the QCL assumption for control resource set 0, the UE may have options for how to handle the QCL assumption for the active data TCI state. For example, if a first active control TCI state associated with control resource set 0 is reused by the active data TCI state, and the QCL assumption for control resource set 0 is changed by the random access procedure, the UE may have the option of having the active data TCI state follow the QCL assumption for control resource set 0 or change to follow the QCL assumption of the other active control TCI state (e.g., which was not updated). The UE may also have the option to have the active data TCI state never follow the active control TCI state associated with control resource set 0. Therefore, a UE as described herein with the capability of supporting two control channel QCL assumptions and one data channel QCL assumption may implement techniques for determining which active control TCI state the active data TCI state should reuse after a QCL assumption for one of the two active control TCI states is changed.

Aspects of the disclosure are initially described in the context of a wireless communications system. Aspects of the disclosure are further illustrated by and described with reference to apparatus diagrams, timelines, system diagrams, and flowcharts that relate to transmission configuration indication determination for a shared data channel.

FIG. 1 illustrates an example of a wireless communications system 100 in accordance with aspects of the present disclosure. The wireless communications system 100 includes base stations 105, UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 may use beamformed communications. The base station 105 may configure a downlink receive beam at the UE 115 by transmitting an indication of a TCI to the UE 115. The TCI may include a QCL reference that assists the UE 115 in selecting the receive beam. For example, the QCL reference may indicate spatial characteristics of the base station transmit beam such that the UE 115 can select an appropriate receive beam. The UE 115 may be configured with one or more TCI state configurations. Different TCI states, distinguished by different values of the TCI, may correspond to QCL relationships with different reference signal transmissions. By configuring the TCI states at the UE 115, the base station 105 can dynamically select beams for downlink transmission to the UE 115, and the UE 115 can select the corresponding receive beam to receive the downlink transmission. In some cases, the number of active TCI states configured at the UE 115 may be based on UE capability. The UE 115 may report its capability for a number of active TCI states to the base station, and the base station 105 may configure the UE 115 with up to that many active QCL assumptions for downlink control and data transmissions.

There may be situations where the QCL assumption for a control resource set is updated. For example, during a random access channel procedure, the base station 105 may transmit multiple reference signals on different beams during the random access channel procedure, and the UE 115 may transmit a random access channel preamble indicating the beam with the strongest reference signal. Upon indicating the downlink beam, the QCL assumption for a control resource set (e.g., control resource set 0) may be updated to the indicated downlink beam. The base station 105 may transmit a random access channel response message on the downlink beam in response to receiving the random access channel preamble.

In an example, the UE 115 may be capable of supporting two active QCL assumptions for control signaling and one active QCL assumption for data. In some examples, the UE 115 may support at most two downlink receive beams and reuse one of the active control TCI states for the active data TCI state (e.g., data and control signaling share a downlink receive beam). When the UE 115 changes the QCL assumption for one of the active control TCI states, the UE 115 may have options for how to assign the active data TCI state. For example, if a first active control TCI state is reused by the active data TCI state, and the QCL assumption for the first active control TCI state is changed by the random access procedure, the UE 115 may have the option of having the active data TCI state reuse the first active control TCI state or reuse the second active TCI state (e.g., which was not updated). Therefore, a UE 115 as described herein with the capability of supporting two control channel QCL assumptions and one data channel QCL assumption may implement techniques for determining which active control TCI state the active data TCI state should reuse after a QCL assumption for one of the two active control TCI states is changed.

Figure 2:
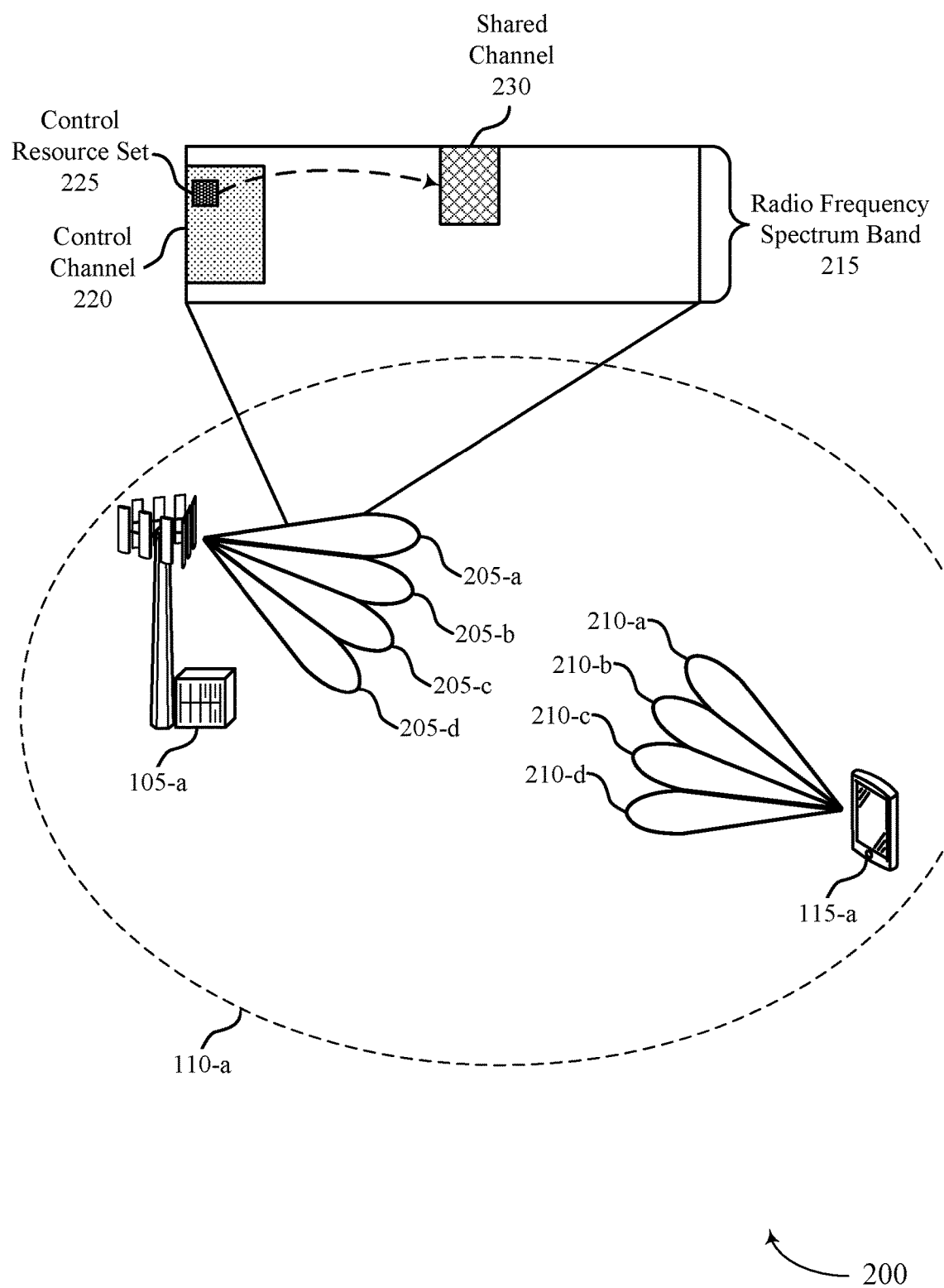
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100.

The wireless communications system 200 may include UE 115-a and base station 105-a, which may be respective examples of a UE 115 and a base station 105 as described herein. UE 115-a and base station 105-a may communicate using beamformed communications. For example, base station 105-a may directionally transmit or receive using one or more beams (e.g., base station beams 205), and UE 115-a may directionally receive or transmit using one or more beams (e.g., UE beams 210).

UE 115-a may identify a receive beam which to receive downlink data and control communications from base station 105-a. In some cases, base station 105-a may configure a downlink receive beam for UE 115-a. For example, to configure the downlink receive beam at UE 115-a, base station 105-a may transmit an indication of a TCI to UE 115-a. The TCI may include a QCL reference that assists UE 115-a in selecting the receive beam.

A QCL reference may indicate a relationship between a previously transmitted reference signal and the scheduled downlink transmission. The QCL relationship may indicate to UE 115-a that the downlink shared channel demodulation reference signals of the scheduled downlink transmission are quasi co-located to the previously transmitted reference signal, and UE 115-a can assume the same channel when receiving the schedule downlink transmission as the previously transmitted reference signal. UE 115-a may use DM-RS as a reference signal for decoding physical downlink shared channel (PDSCH) transmissions. Therefore, if UE 115-a assumes the scheduled downlink transmission from base station 105-a has the same demodulation reference signals as a previously received reference signal, UE 115-a may be able to reuse the channel assumptions to receive the scheduled downlink transmission. Examples of previously transmitted reference signals may include reference signals transmitted in a SSB, a CSI-RS, reference signals transmitted during a random access channel procedure (e.g., a random access channel (RACH) procedure), etc.

UE 115-a may determine spatial characteristics (e.g., the direction), Doppler spread, Doppler shift, average delay, and average spread, or any combination thereof, for the downlink transmission based on the QCL relationship to the indicated TCI state, and UE 115-a may select a receive beam accordingly. In some cases, UE 115-a may select a base station beam 205 and a UE beam 210, which may be referred to as a beam link pair together. For example, if the QCL relationship indicates the direction of the downlink transmit beam, UE 115-a may select a corresponding downlink receive beam pointed in a direction which provides the strongest beam pair link connection. In some cases, UE 115-a may transmit an indication of the beam link pair to base station 105-a. For beam selection via control signaling, base station 105-a may identify a beam pair and configure UE 115-a with a downlink beam via DCI or a MAC CE.

UE 115-a may be configured with one or more TCI state configurations. Different TCI states, distinguished by different values of the TCI, may correspond to QCL relationships with different reference signal transmissions. For example, each TCI state may be associated with one of the previously received reference signals. By configuring the TCI states at UE 115-a, base station 105-a can dynamically select beams for downlink transmission to UE 115-a, and UE 115-a can select the corresponding receive beam to receive the downlink transmission. For a downlink transmission, base station 105-a may transmit an indication of the TCI state to UE 115-a, and UE 115-a may select the corresponding receive beam based on the indicated TCI state to receive the downlink transmission. In some cases, the TCI states may be configured via higher layer signaling.

In some cases, the number of TCI states configured at UE 115-*a* may be limited based on UE capability. UE 115-*a* may report its capability for a number of active TCI states to base station 105-*a*, and base station 105-*a* may configure that many active QCL assumptions for downlink control and data transmissions. In some cases, UE 115-*a* may be configured to support one additional active TCI state for control signaling in addition to the supported number of active TCI states for PDSCH. In some examples, UE 115-*a* may be configured to support an additional active TCI state for PDCCH. As TCI states correspond to downlink beams, if the number of configured, or active, TCI states is limited at UE 115-*a*, the number of active downlink receive beams may also be limited. If, for example, UE 115-*a* indicates its capability to support one active TCI state, then downlink data and control transmissions may share a single active downlink receive beam. If UE 115-*a* indicates a capability to support two active control QCL assumptions and one active data QCL assumption, UE 115-*a* may use two receive beams, where one of the receive beams is used just for data signaling and one receive beam is used for both data and control signaling. By limiting the number of active beams, the complexity at UE 115-*a* to identify a downlink receive beam for communicating with base station 105-*a* may be reduced.

In an example, UE 115-*a* may have a TCI state configured which associates base station beam 205-*a* and UE beam 210-*a*. Base station beam 205-*a* and UE beam 210-*a* may be at least spatially quasi co-located such that the two beams point toward each other, which may lead to a strong connection. Thus, when base station 105-*a* transmits a TCI indicating the use of base station beam 205-*a* for a scheduled downlink transmission, UE 115-*a* may select UE beam 210-*a* as a receive beam to receive the scheduled transmission based on the QCL association. Base station 105-*a* may transmit to UE 115-*a* on a bandwidth part of a radio frequency spectrum band 215. A portion of the frequency resources for a period of time may be allocated for a control channel 220. Base station 105-*a* may transmit control signaling on a control resource set 225 of the control channel 220. The control signaling may schedule UE 115-*a* for a data transmission on a shared channel 230

UE 115-*a* may monitor for the control signaling using the QCL associated beam, UE beam 210-*a*, as the downlink receive beam. UE 115-*a* may search (e.g., by performing blind decodings) a search space corresponding to the control channel 220 for the control resource set 225 to receive the control signaling. In some cases, UE 115-*a* may be configured with a finite number of TCI states for control signaling, and UE 115-*a* may perform searches for control information for each of the TCI states configured for control signaling. UE 115-*a* may receive the control signaling and select a beam to use to receive the data transmission on the shared channel 230. Based on the indicated TCI state and the QCL association for UE beam 210-*a* and base station beam 205-*a*, UE 115-*a* may assume the channel characteristics for the shared channel 230 to receive the data transmission. If the receive beam used to receive the control information is quasi co-located with the active data TCI state, then UE 115-*a* may reuse the downlink receive beam to monitor for the shared channel 230 and receive the data transmission.

There may be situations where the QCL assumption for a control resource set is updated. For example, a QCL assumption for a common control resource set associated with handover and cell management (e.g., control resource set 0) may be updated after UE 115-*a* performs a random access channel procedure. In some cases, when performing a random access channel procedure, except for a contention-free random access initiated by PDCCH order, the QCL of control resource set 0 may be updated based on the downlink beam selected in the random access channel procedure until the TCI state is reactivated for control resource set 0. Base station 105-*a* may transmit multiple reference signals, each corresponding to a different beam, during the random access channel procedure. UE 115-*a* may measure the reference signals and transmit a random access channel preamble indicating the downlink beam with the strongest measured reference signal. The QCL assumption for control resource set 0 may then be updated to the beam indicated by the random access channel preamble.

During the time after the random access channel procedure, there may not be a valid TCI state for control resource set 0, and the techniques described herein clarify the QCL of the data channel (e.g., PDSCH) as to whether a UE is to follow the original TCI state of control resource set 0 or not. If UE 115-*a* signals a capability of two active control QCL assumptions and one active data QCL assumption, and the control QCL assumption which is reused by the data QCL assumption is update, UE 115-*a* may have a choice for updating the active data TCI state, which may be an example of a PDSCH TCI state. Without updating the active data TCI state, UE 115-*a* would have three active receive beams (e.g., two for control and one separate one for data), which may exceed the UE's capability. Therefore, UE 115-*a*, and other UEs 115 described herein, may implement techniques for determining which control QCL assumption the data QCL assumption should follow after a control QCL assumption is changed by a random access channel procedure.

In a first example, if the data TCI state originally follows the TCI associated with control resource set 0, then the PDSCH TCI state may follow the TCI associated with control resource set 0 after performing the random access channel procedure. For example, if base station 105-*a* transmits a MAC CE to configure the active data TCI state to be the same as the active control TCI state associated with control resource set 0, then UE 115-*a* may update the active data TCI state to have the same QCL assumption as the updated active control TCI state. The active QCL assumption for data may follow the QCL assumption for control resource set 0 after base station 105-*a* reconfigures a new TCI state for control resource set 0.

In a second example, the data TCI state may always follow the active TCI state for control resource sets other than control resource set 0. If the active data TCI state does not follow the active control TCI state associated with control resource set 0, then the active data TCI state may not be updated if the QCL assumption for control resource set 0 is updated based on a random access channel procedure. The active data TCI state will not be deactivated by the random access channel procedure and therefore may always be valid.

In a third example, if the data TCI originally follows the TCI of control resource set 0, then the data TCI may follow the other TCI for control resource sets other than control resource set 0 if the QCL assumption for control resource set 0 is updated by the random access channel procedure. The data TCI may originally follow the TCI of control resource set 0 if base station 105-*a* selects, by transmitting a MAC CE, the PDSCH TCI state to be the same as the control TCI state for control resource set 0. UE 115-*a* may, or may not, update the PDSCH TCI to switch to a new TCI state configured for control resource set 0 when base station 105-*a* reactivates the TCI state for control resource set 0.

Figure 3:
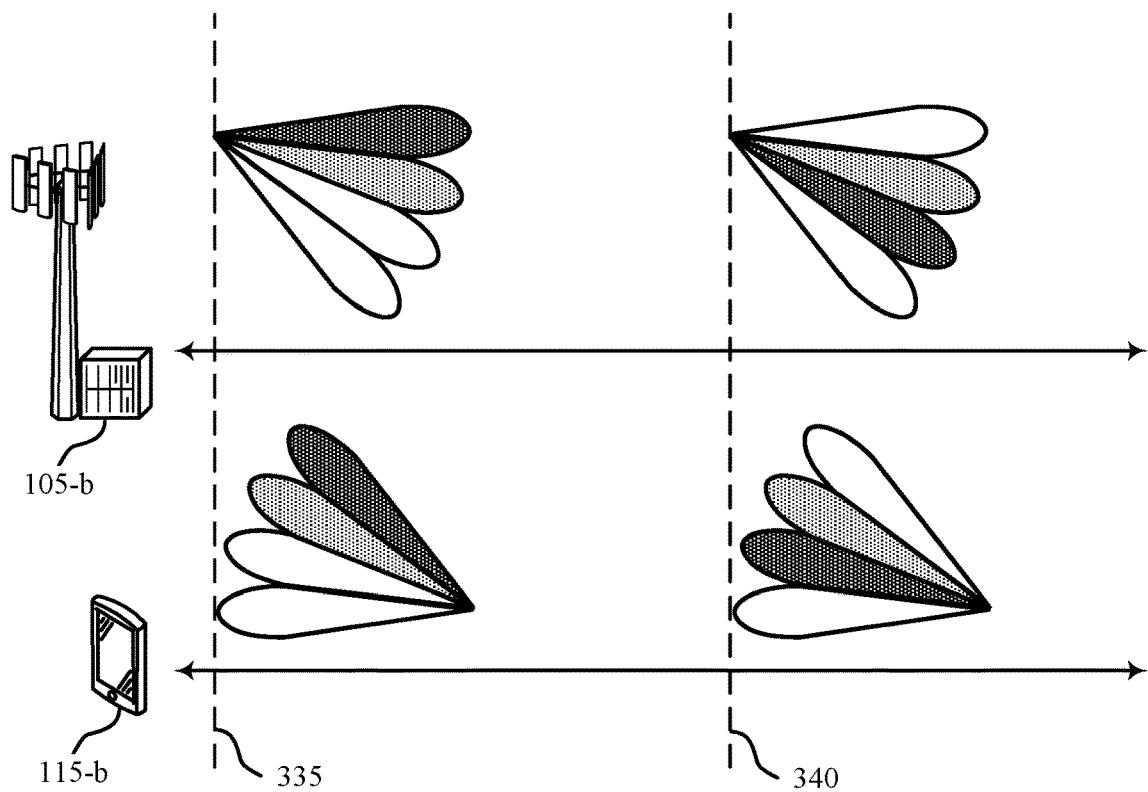
FIGS. 3 through 5 illustrate examples of transmission configuration indication state timelines in accordance with aspects of the present disclosure.
Figure 3:
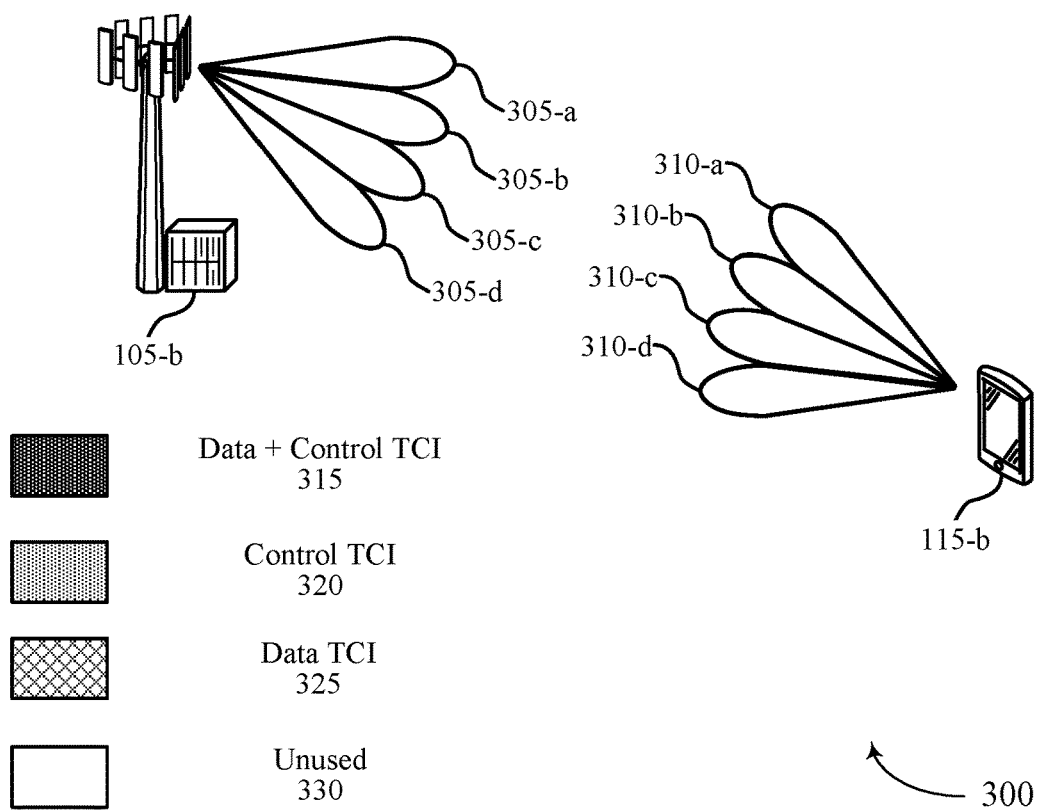

FIG. 3 illustrates an example of a TCI state timeline 300 in accordance with aspects of the present disclosure. In some examples, TCI state timeline 300 may implement aspects of wireless communications system 100. The TCI state timeline 300 may include base station 105-b and UE 115-b, which may be respective examples of a base station 105 and a UE 115 as described herein. The TCI state timeline 300 may illustrate changes to the configured TCI states and beams used by UE 115-b and base station 105-b before and after performing a random access channel procedure.

UE 115-b and base station 105-b may communicate using beamformed communications as described with reference to FIG. 1 and FIG. 2. Base station 105-b may directionally transmit or receive using one or more base station beams 305, and UE 115-b may directionally receive or transmit using one or more UE beams 310. A downlink beam may be configured for a data and control TCI 315, a control TCI 320, a data TCI 325, or the downlink beam may not be used (e.g., unused 330).

UE 115-b may be capable of supporting two active control TCI states. An active data TCI state may reuse one of the two active control TCI states, such that UE 115-b uses a common beam for data and control signaling. UE 115-b may report its capability to support a number of active TCI states per bandwidth part per component carrier, including control and data signaling. The capability may correspond to a maximum number of configured TCI states per component carrier for data transmission. If UE 115-b reports X active TCI states, it is not expected that any more than X active QCL assumptions for any PDSCH and any control resource sets for a given bandwidth part of a serving cell become active for UE 115-b. UE 115-b may transmit signaling to base station 105-b indicating two active control TCI states and one active data TCI state. For example, UE 115-b may report the capability to support one active QCL assumption for downlink shared channel (e.g., PDSCH) transmissions and two active QCL assumptions for downlink control channel (e.g., PDCCH) transmissions. For example, in a UE feature list of a feature group, a UE 115 that reports X active TCI states may indicate up to X active QCL assumptions for PDCCH/PDSCH transmissions. As a special case, a UE indicating that X=1 may mean that up to all PDSCH/PDCCH transmissions may use single active DL beam.

In some cases, the capability signaling may be based on a frequency range in which UE 115-b operates. For component 1, the candidate value set may include {1, 2, 4, 8}, and for component 2, the candidate value set may include {4, 8, 16, 32, 64, 128}. For frequency range 2, UE 115-b may signal 64. For frequency range 1, UE 115-b may report at least the maximum number of allowed SSBs in the band. In some cases, UE 115-b may signal [64, 128] for the frequency range 2 values.

At 335, UE 115-b may have a first TCI state configured for a first downlink beam and a second TCI state configured for a second downlink beam. UE 115-b may have signaled its number of active QCL assumptions, indicated that UE 115-b is capable of only using a single receive beam for subsequent PDSCH and PDCCH reception related to control resource sets based on the indicated single active TCI state. Base station 105-b may transmit a TCI indicating a QCL assumption for UE 115-b to use for downlink control and data signaling based on receiving the capability signaling. The first downlink beam may have a QCL association between base station beam 305-a and UE beam 310-a. The second downlink beam may have a QCL association between base station beam 305-b and UE beam 310-b. The first TCI state may be a data and control TCI 315, and the second TCI state may be a control TCI 320. Thus, when base station 105-b transmits downlink control signaling on base station beam 305-a to schedule a downlink data transmission on a downlink shared channel, UE 115-b selects UE beam 310-a and assumes the channel conditions for the downlink shared channel based on a QCL association of the first TCI state. For example, UE 115-b may assume that the demodulation reference signals for the downlink shared channel have the same properties as a reference signal in an SSB transmitted on base station beam 305-a. In some cases, base station 105-b may have configured the first TCI state via a MAC CE. Other base station beams 305, including base station beam 305-c, and 305-d, may not be used at 335 for communication between UE 115-b and base station 105-b. In this example, the first active TCI state (e.g., the data and control TCI 315 at 335) associating base station beam 305-b and UE beam 310-b may be configured for control resource set 0.

At 340, UE 115-b may perform a random access channel procedure (e.g., a RACH procedure). Base station 105-b may transmit a reference signal on multiple beams, and UE 115-b may measure the different reference signals. UE 115-b may identify the downlink beam with the highest quality reference signal and transmit an indication of the identified downlink beam in a random access channel preamble to base station 105-b. Base station 105-b may transmit a random access response to UE 115-b on the selected downlink beam. In some cases, the identified downlink beam may be associated with a receive beam other than a receive beam configured in the active TCI states. For example, the identified downlink beam may be base station beam 305-c, which may be paired with UE beam 310-c. The QCL association for control resource set 0 may be updated based on the downlink beam selected in the random access channel procedure to base station beam 305-c and UE beam 310-c.

In this example, the data TCI state may always follow the active TCI state for control resource sets other than control resource set 0. If the active data TCI state does not follow the active control TCI state associated with control resource set 0, then the active data TCI state may not be updated if the QCL assumption for control resource set 0 is updated based on a random access channel procedure. The active data TCI state will not be deactivated by the random access channel procedure and therefore may always be valid. Therefore, the control TCI 320 associated with control resource set 0 may be moved to base station beam 305-c and UE beam 310-c, but the data TCI may not change from base station beam 305-a and UE beam 310-a.

In a first example, since the data TCI state originally follows the TCI associated with control resource set 0, the data TCI state may follow the TCI state associated with control resource set 0 after the random access channel procedure at 340. For example, if base station 105-b transmits a MAC CE to configure the active data TCI state to be the same as the active control TCI state associated with control resource set 0, then UE 115-b may update the active data TCI state to have the same QCL assumption as the updated active control TCI state. As shown, after the random access procedure at 340, the data and control TCI 315 is configured for base station beam 305-c and UE beam 310-c, which was selected during the random access channel procedure. The active QCL assumption for data may follow the QCL assumption for control resource set 0 after base station 105-b reconfigures a new TCI state for control resource set 0.

Figure 4:
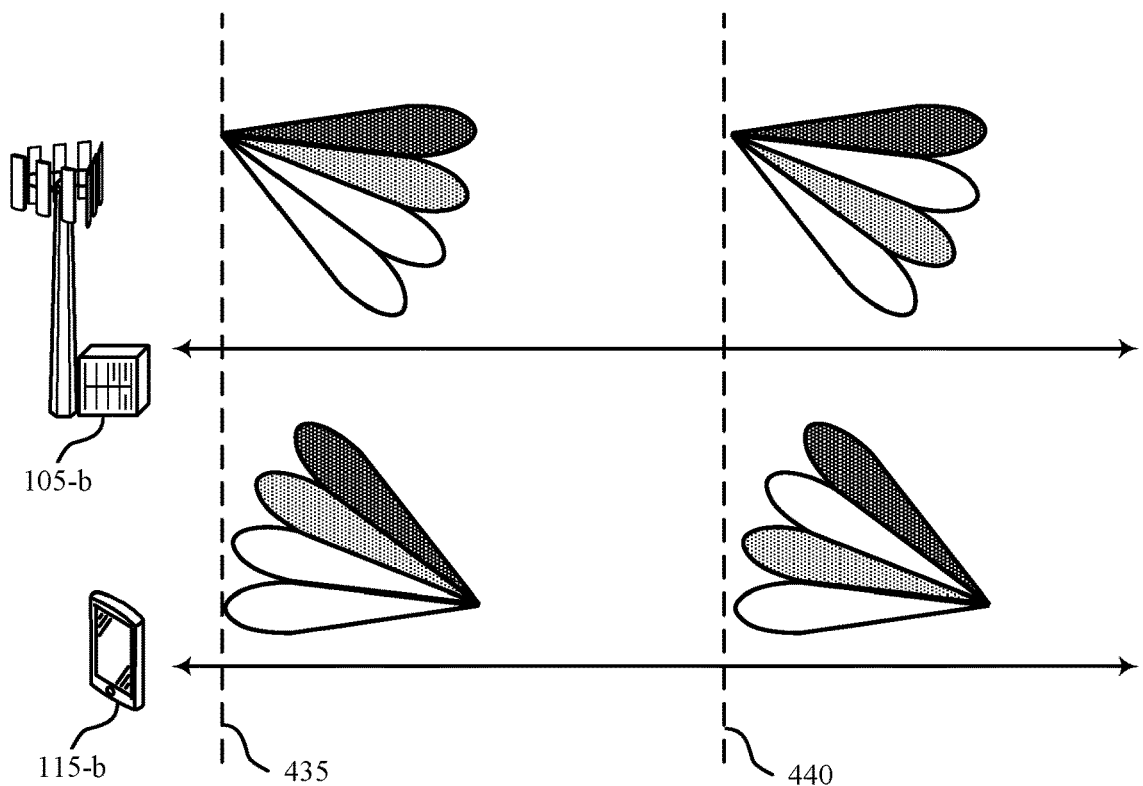
Figure 4:
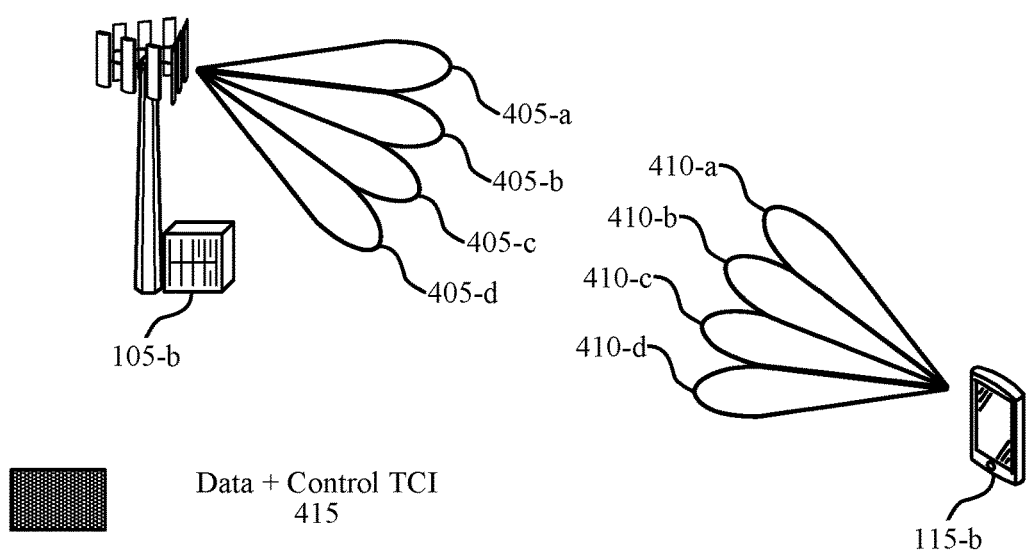

FIG. 4 illustrates an example of a TCI state timeline 400 in accordance with aspects of the present disclosure. In some examples, TCI state timeline 400 may implement aspects of wireless communications system 100. The TCI state timeline 400 may include base station 105-c and UE 115-c, which may be respective examples of a base station 105 and a UE 115 as described herein. The TCI state timeline 400 may illustrate changes to the configured TCI states and beams used by UE 115-c and base station 105-c before and after performing a random access channel procedure.

UE 115-c and base station 105-c may communicate using beamformed communications as described with reference to FIG. 1 and FIG. 2. Base station 105-c may directionally transmit or receive using one or more base station beams 405, and UE 115-c may directionally receive or transmit using one or more UE beams 410. A downlink beam may be configured for a data and control TCI 415, a control TCI 420, a data TCI 425, or the downlink beam may not be used.

UE 115-c may be capable of supporting two active control TCI states. An active data TCI state may reuse one of the two active control TCI states, such that UE 115-c uses a common beam for data and control signaling. UE 115-c may report its capability to support a number of active TCI states per bandwidth part per component carrier, including control and data signaling. The capability may correspond to a maximum number of configured TCI states per component carrier for data transmission. If UE 115-c reports X active TCI states, it is not expected that any more than X active QCL assumptions for any PDSCH and any control resource sets for a given bandwidth part of a serving cell become active for UE 115-c. UE 115-c may transmit signaling to base station 105-c indicating two active control TCI states and one active data TCI state, reporting the capability to support one active QCL assumption for downlink shared channel (e.g., PDSCH) transmissions and two active QCL assumptions for downlink control channel (e.g., PDCCH) transmissions.

At 435, UE 115-c may have a first TCI state configured for a first downlink beam and a second TCI state configured for a second downlink beam. The first downlink beam may have a QCL association between base station beam 405-a and UE beam 410-a. The second downlink beam may have a QCL association between base station beam 405-b and UE beam 410-b. The first TCI state may be a data and control TCI 415, and the second TCI state may be a control TCI 420. Thus, when base station 105-c transmits downlink control signaling on base station beam 405-a to schedule a downlink data transmission on a downlink shared channel, UE 115-c selects UE beam 410-a and assumes the channel conditions for the downlink shared channel based on a QCL association of the first TCI state. For example, UE 115-c may assume that the demodulation reference signals for the downlink shared channel have the same properties as a reference signal in an SSB transmitted on base station beam 405-a. In some cases, base station 105-c may have configured the first TCI state via a MAC CE. Other base station beams 405, including base station beam 405-c, and 405-d, may not be used at 435 for communication between UE 115-c and base station 105-c. In this example, the second active TCI state (e.g., the control TCI 420 at 435) for base station beam 405-b and UE beam 410-b may be configured for control resource set 0.

At 440, UE 115-c may perform a random access channel procedure (e.g., a RACH procedure). Base station 105-c may transmit a reference signal on multiple beams, and UE 115-c may measure the different reference signals. UE 115-c may identify the downlink beam with the highest quality reference signal and transmit an indication of the identified downlink beam in a random access channel preamble to base station 105-c. Base station 105-c may transmit a random access response to UE 115-c on the selected downlink beam. In some cases, the identified downlink beam may be associated with a receive beam other than a receive beam configured in the active TCI states. For example, the identified downlink beam may be base station beam 405-c, which may be paired with UE beam 410-c. The QCL association for control resource set 0 may be updated based on the downlink beam selected in the random access channel procedure to base station beam 405-c and UE beam 410-c.

In this example, the data TCI state may always follow the active TCI state for control resource sets other than control resource set 0. If the active data TCI state does not follow the active control TCI state associated with control resource set 0, then the active data TCI state may not be updated if the QCL assumption for control resource set 0 is updated based on a random access channel procedure. In some cases, the active data TCI state may not be deactivated by the random access channel procedure and therefore may be valid. Therefore, the control TCI 420 associated with control resource set 0 may be moved to base station beam 405-c and UE beam 410-c, but the data TCI may not change from base station beam 405-a and UE beam 410-a.

In some examples, if the PDSCH TCI originally follows the TCI of control resource set 0 (e.g., a MAC CE selected TCI for PDSCH is the one used for control resource set 0), then the PDSCH TCI may follow the other TCI for other control resource sets (e.g., other than control resource set 0) if the QCL of control resource set 0 is updated during a random access procedure. The PDSCH TCI may or may not switch to the new TCI of control resource set 0 if re-activated.

If TCI is indicated via DCI and when UE is not configured with a parameter to indicate whether TCI is present in DCI (e.g., tci-PresentInDCI is not configured), if an offset between the reception of the downlink DCI and the corresponding PDSCH is less than a threshold (e.g., Threshold-Sched-Offset), the UE 115 may assume that the DM-RS ports of PDSCH of a serving cell may be quasi co-located with the reference signals in the TCI state with respect to the QCL parameters used for PDCCH quasi co-location indication of the control resource set associated with a monitored search space with a lowest control resource set identifier in the latest slots in which one or more control resource sets within the active bandwidth part of the serving cell are monitored by the UE 115. In this example, if the QCL type D of the PDSCH demodulation reference signal is different from that of the PDCCH demodulation reference signal with which they overlap in at least one symbol, the UE 115 may be expected to prioritize reception of PDCCH associated with that control resource set. This may also apply to intra-band carrier aggregation cases, where PDSCH and the control resource set may be in different component carriers. If none of the configured TCI state contain QCL Type D, the UE 115 may obtain the other QCL assumptions from the indicated TCI states for its scheduled PDSCH irrespective of the time offset between the reception of the downlink DCI and the corresponding PDSCH.

Figure 5:
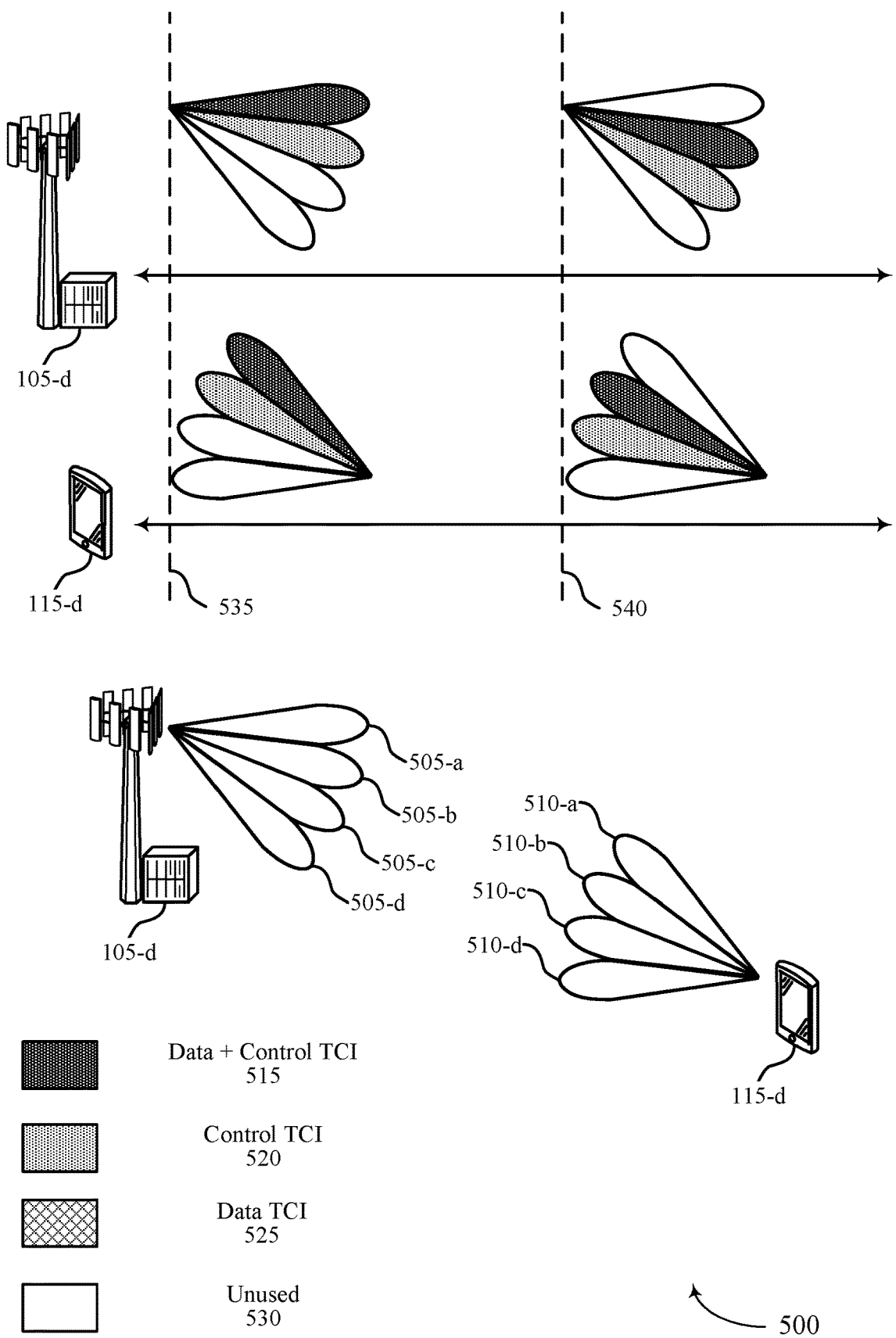

FIG. 5 illustrates an example of a TCI state timeline 500 in accordance with aspects of the present disclosure. In some examples, TCI state timeline 500 may implement aspects of wireless communications system 100. The TCI state timeline 500 may include base station 105-d and UE 115-d, which may be respective examples of a base station 105 and a UE 115 as described herein. The TCI state timeline 500 may show changes to the configured TCI states and beams used by UE 115-*d* and base station 105-*d* before and after performing a random access channel procedure.

UE 115-*d* and base station 105-*d* may communicate using beamformed communications as described with reference to FIG. 1 and FIG. 2. Base station 105-*d* may directionally transmit or receive using one or more base station beams 505, and UE 115-*d* may directionally receive or transmit using one or more UE beams 510. A downlink beam may be configured for a data and control TCI 515, a control TCI 520, a data TCI 525, or the downlink beam may not be used (e.g., unused 530).

UE 115-*d* may be capable of supporting two active control TCI states. An active data TCI state may reuse one of the two active control TCI states, such that UE 115-*d* uses a common beam for data and control signaling. UE 115-*d* may report its capability to support a number of active TCI states per bandwidth part per component carrier, including control and data signaling. The capability may correspond to a maximum number of configured TCI states per component carrier for data transmission. If UE 115-*d* reports X active TCI states, it is not expected that any more than X active QCL assumptions for any PDSCH and any control resource sets for a given bandwidth part of a serving cell become active for UE 115-*d*. UE 115-*d* may transmit signaling to base station 105-*d* indicating two active control TCI states and one active data TCI state, reporting the capability to support one active QCL assumption for downlink shared channel (e.g., PDSCH) transmissions and two active QCL assumptions for downlink control channel (e.g., PDCCH) transmissions.

At 535, UE 115-*d* may have a first TCI state configured for a first downlink beam and a second TCI state configured for a second downlink beam. The first downlink beam may have a QCL association between base station beam 505-*a* and UE beam 510-*a*. The second downlink beam may have a QCL association between base station beam 505-*b* and UE beam 510-*b*. The first TCI state may be a data and control TCI 515, and the second TCI state may be a control TCI 520. Thus, when base station 105-*b* transmits downlink control signaling on base station beam 505-*a* to schedule a downlink data transmission on a downlink shared channel, UE 115-*b* selects UE beam 510-*a* and assumes the channel conditions for the downlink shared channel based on a QCL association of the first TCI state. For example, UE 115-*b* may assume that the demodulation reference signals for the downlink shared channel have the same properties as a reference signal in an SSB transmitted on base station beam 505-*a*. In some cases, base station 105-*b* may have configured the first TCI state via a MAC CE. Other base station beams 505, including base station beam 505-*c*, and 505-*d*, may not be used at 535 for communication between UE 115-*b* and base station 105-*b*.

In this example, the first active TCI state (e.g., the data and control TCI 515 at 535) for base station beam 505-*a* and UE beam 510-*a* may be configured for control resource set 0. At 540, UE 115-*b* may perform a random access channel procedure (e.g., a RACH procedure). Base station 105-*b* may transmit a reference signal on multiple beams, and UE 115-*b* may measure the different reference signals. UE 115-*b* may identify the downlink beam with the highest quality reference signal and transmit an indication of the identified downlink beam in a random access channel preamble to base station 105-*b*. Base station 105-*b* may transmit a random access response to UE 115-*b* on the selected downlink beam. In some cases, the identified downlink beam may be associated with a receive beam other than a receive beam configured in the active TCI states. For example, the identified downlink beam may be base station beam 505-*c*, which may be paired with UE beam 510-*c*. The QCL association for control resource set 0 may be updated based on the downlink beam selected in the random access channel procedure to base station beam 505-*c* and UE beam 510-*c*.

In this example, the data TCI state originally follows the TCI of control resource set 0, but the data TCI state follows the other TCI for control resource sets other than control resource set 0 after the QCL assumption of control resource set 0 is updated by the random access channel procedure. For example, the TCI for control resource set 0 moves from UE beam 510-*a* to UE beam 510-*c*, while the data TCI moves from UE beam 510-*a* to UE beam 510-*b*. The control TCI for the other control resource sets may remain associated with UE beam 510-*b*. The data TCI may originally follow the TCI of control resource set 0 if base station 105-*d* selects, by transmitting a MAC CE, the data TCI state to be the same as the control TCI state for control resource set 0. UE 115-*d* may, or may not, update the data TCI to switch to a new TCI state configured for control resource set 0 when base station 105-*a* reactivates the TCI state for control resource set 0.

Figure 6:
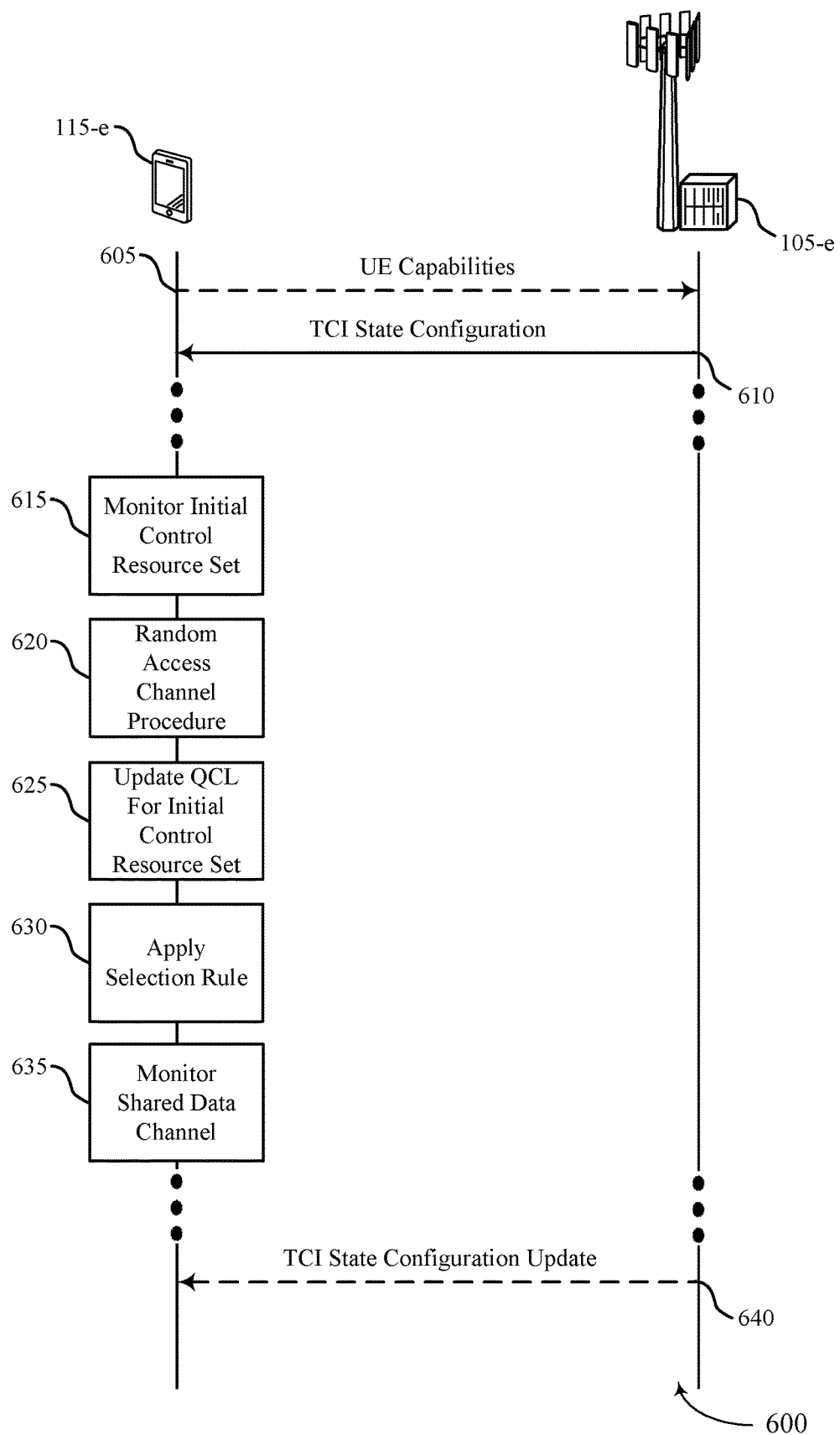
FIG. 6 illustrates an example of a process flow in accordance with aspects of the present disclosure.

FIG. 6 illustrates an example of a process flow 600 in accordance with aspects of the present disclosure. In some examples, process flow 600 may implement aspects of wireless communications system 100. The process flow 600 may include UE 115-*e* and base station 105-*e*, which may be respective examples of a UE 115 and a base station 105 as described with reference to FIG. 1.

In some cases, UE 115-*e* may transmit capability signaling indicating that UE 115-*e* supports two active TCI states at 605. UE 115-*e* may support two active TCI states for control signaling and one active TCI state for data signaling. In some cases, the active data TCI state may reuse a beam of an active control TCI state such that control signaling for some control resource sets and data signaling use the same beam. In some cases, the initial control resource set may be an example of control resource set 0 as described herein. The second control resource set may be an example of other control resource sets which do not include control resource set 0.

At 610, UE 115-*e* may receive configuration signaling configuring a first active TCI state for an initial control resource set and a second active TCI state for a second control resource set. In some cases, UE 115-*e* may receive a MAC CE indicating to apply the first active TCI state or the second active TCI state as an active TCI state for the shared data channel. For example, either the downlink beam associated with the first active TCI state or the downlink beam associated with the second active TCI state may be used for both downlink control and data signaling.

At 615, UE 115-*e* may monitor the initial control resource set using a first beam corresponding to the first TCI state, the second control resource set using a second beam corresponding to the second TCI state, and a shared data channel using one of the first beam or the second beam. In some cases, the shared data channel may be an example of a PDSCH channel.

At 620, UE 115-*e* may perform a random access channel procedure to select a third beam from a set of different beams. Base station 105-*e* may transmit a set of reference signals that each correspond to a respective beam of the set of different beams. UE 115-*e* may generate a set of reference signal measurements that each correspond to a respective beam of set of the different beams.

At 625, UE 115-*e* may update a QCL assumption for the initial control resource set to correspond to the third beam.

For example, UE 115-e may measure multiple beams of base station 105-e during the random access channel procedure. UE 115-e may identify the beam which produces the strongest reference signal measurement (e.g., the third beam), and select this beam for the random access channel procedure. UE 115-e may transmit a random access channel preamble to base station 105-e, the preamble including an indication of the third beam. In response to receiving the random access channel preamble, base station 105-e may transmit a random access channel response message to UE 115-e. The random access channel response message may be transmitted on the selected beam. The random access channel response message may be transmitted on resources associates with control resource set 0. Therefore, to receive the random access channel response message, UE 115-e may update the QCL assumption for control resource set 0 to the selected beam (e.g., the third beam). UE 115-e may then use the third beam for downlink PDSCH and PDCCH reception related to control resource set 0 based on updating the QCL assumption for control resource set 0 to the third beam.

As described herein, UE 115-e may use two QCL assumptions for control signaling and one QCL assumption for data signaling, where the data QCL assumption follow one of the two control QCL assumptions. When UE 115-e update a control QCL assumption for control resource set 0 based on the random access channel procedure, UE 115-e may also update the data QCL assumption. For example, if the data QCL assumption followed the control QCL assumption which was previously used for control resource set 0, and that control QCL assumption is changed based on the random access procedure, UE 115-e may select between the new beam (e.g., the third beam) for the updated QCL assumption of control resource set 0 or the other QCL assumption used for the other control resource sets (e.g., the second beam described in the process flow 600).

Therefore, at 630, UE 115-e may apply a selection rule for selecting between the second beam and the third beam. In some cases, such as described with reference to FIG. 3, the selection rule may indicate to select the third beam based on an active TCI state for the shared data channel following the first active TCI state for the initial control resource set prior to updating the QCL assumption. In some cases, applying the selection rule further includes selecting the third beam by configuring a QCL assumption for the initial control resource set. In this example, if the active shared data TCI state originally follows the TCI of control resource set 0, then the QCL assumption for the shared data channel will follow that of control resource set 0 after control resource set 0 is updated by the random access procedure. In this example, the active TCI state for the shared data channel may follow the new TCI state of control resource set 0 once the latter is reactivated.

In some cases, such as described with reference to FIG. 4, applying the selection rule includes selecting the second beam by configuring an active TCI state for the shared data channel to follow the second active TCI state for the second control resource set. In this example, the TCI state for the shared data channel always follows the active TCI state for control resource sets other than control resource set 0.

In some cases, such as described with reference to FIG. 5, the selection rule may indicate to select the second beam based on an active TCI state for the shared data channel following the first active TCI state for the initial control resource set prior to updating the QCL assumption. UE 115-e may select the second beam by configuring an active TCI state for the shared data channel to follow the second active TCI state for the second control resource set. In this example, if the data TCI state originally followed the TCI of control resource set 0, then the active data TCI state may follow the other TCI for other control resource sets (e.g., not including control resource set 0) once the QCL assumption of control resource set 0 is updated by a random access channel procedure.

At 635, UE 115-e may monitor the shared data channel using the selected beam. In some cases, UE 115-e may receive a second configuration signaling configuring a third active TCI state for the initial control resource set. For example, base station 105-e may reactivate the TCI state for the initial control resource set by transmitting control signaling at some time after the RACH procedure is performed. The reactivated TCI state may then be used for subsequent PDSCH and PDCCH reception. In some cases, the TCI state for control resource set 0 may be reconfigured to a previously deactivated TCI state or to a new TCI state.

Figure 7:
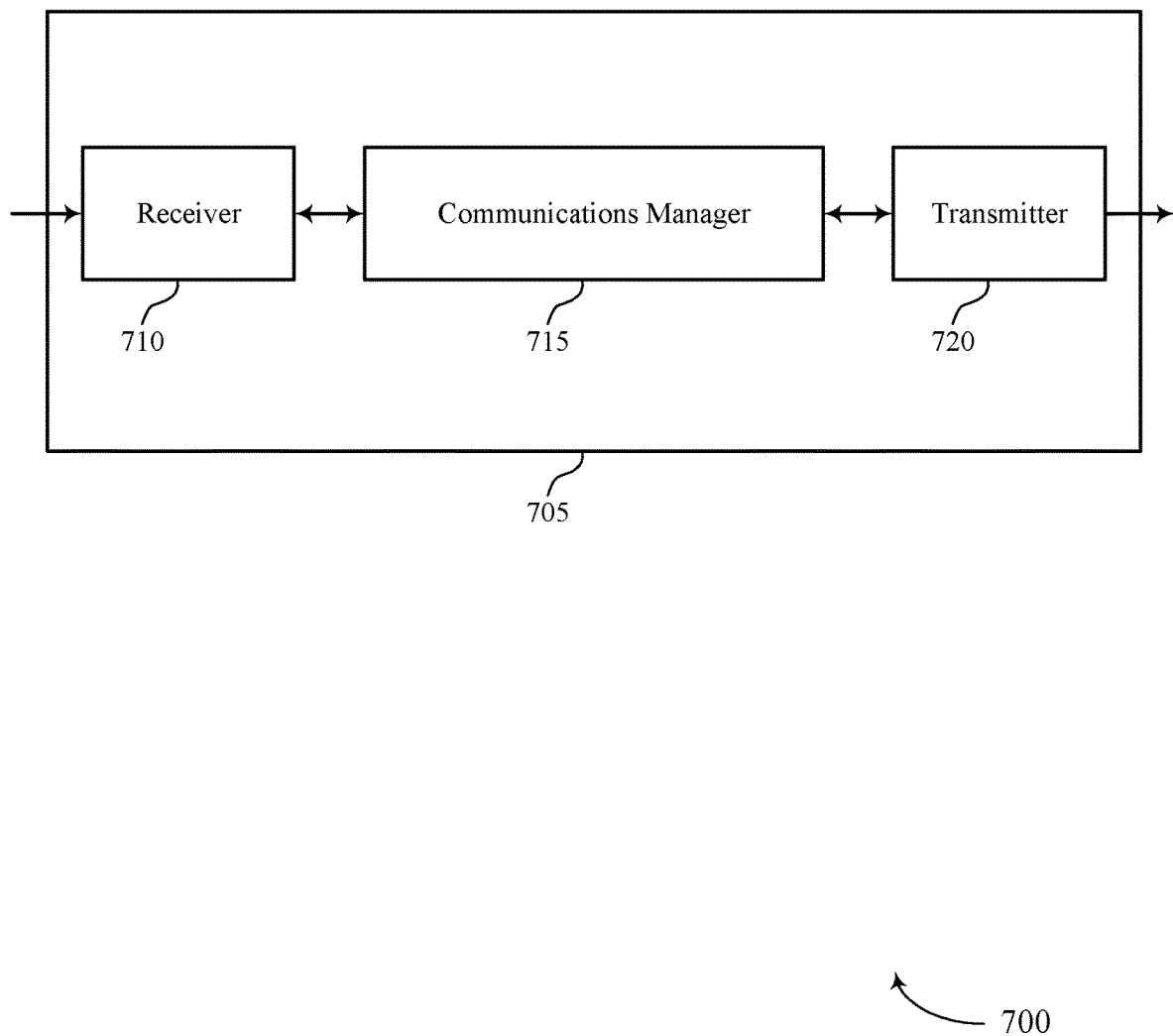
FIGS. 7 and 8 show block diagrams of devices that support transmission configuration indication determination for a shared data channel in accordance with aspects of the present disclosure.

FIG. 7 shows a block diagram 700 of a device 705 in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmission configuration indication determination for a shared data channel, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive configuration signaling configuring a first active transmission configuration indication state for an initial control resource set and a second active transmission configuration indication state for a second control resource set, monitor the initial control resource set using a first beam corresponding to the first active transmission configuration indication state, the second control resource set using a second beam corresponding to the second active transmission configuration indication state, and a shared data channel using one of the first beam or the second beam, monitor the shared data channel using the selected beam, perform a random access channel procedure to select a third beam from a set of different beams, update a quasi co-location assumption for the initial control resource set to correspond to the third beam, and apply a selection rule for selecting between the second beam and the third beam. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 715 as described herein may be implemented to realize one or more potential advantages. One implementation may reduce complexity for a UE 115 to decide a TCI state for a data TCI state when a control TCI state is updated. In some cases, the UE 115 may select a new data TCI state which improves throughput for the UE 115 or provides enhanced data signaling monitoring based on the new data TCI state having a strong beam. Additionally, by using the techniques described herein, the UE 115 may support using beams detected in a random access procedure without exceeding the capability of the UE 115.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
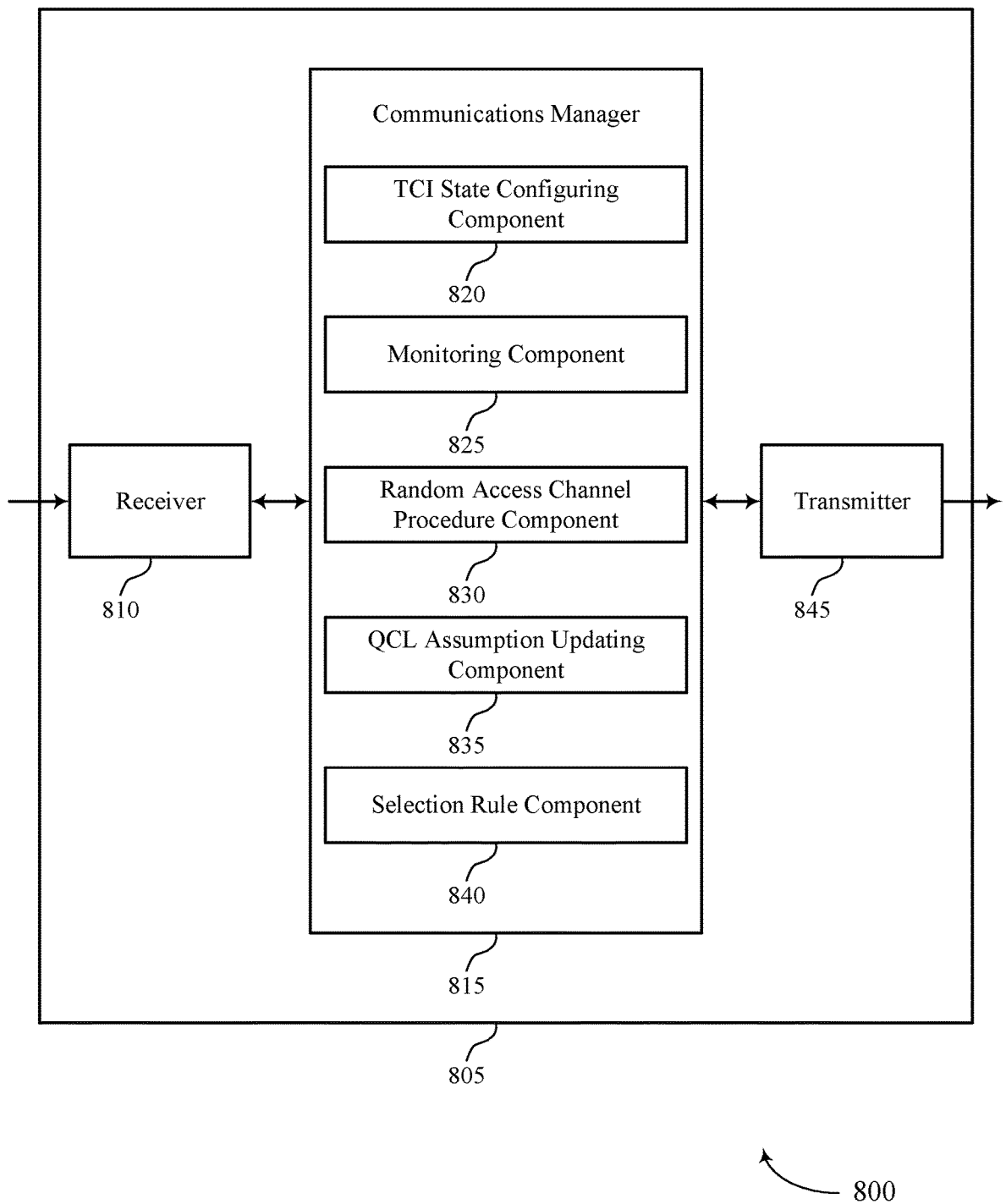

FIG. 8 shows a block diagram 800 of a device 805 in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to transmission configuration indication determination for a shared data channel, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a TCI state configuring component 820, a monitoring component 825, a random access channel procedure component 830, a QCL assumption updating component 835, and a selection rule component 840. The communications manager 815 may be an example of aspects of the communications manager 1010 described herein.

The TCI state configuring component 820 may receive configuration signaling configuring a first active transmission configuration indication state for an initial control resource set and a second active transmission configuration indication state for a second control resource set. The monitoring component 825 may monitor the initial control resource set using a first beam corresponding to the first active transmission configuration indication state, the second control resource set using a second beam corresponding to the second active transmission configuration indication state, and a shared data channel using one of the first beam or the second beam and monitor the shared data channel using the selected beam. The random access channel procedure component 830 may perform a random access channel procedure to select a third beam from a set of different beams. The QCL assumption updating component 835 may update a quasi co-location assumption for the initial control resource set to correspond to the third beam. The selection rule component 840 may apply a selection rule for selecting between the second beam and the third beam.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
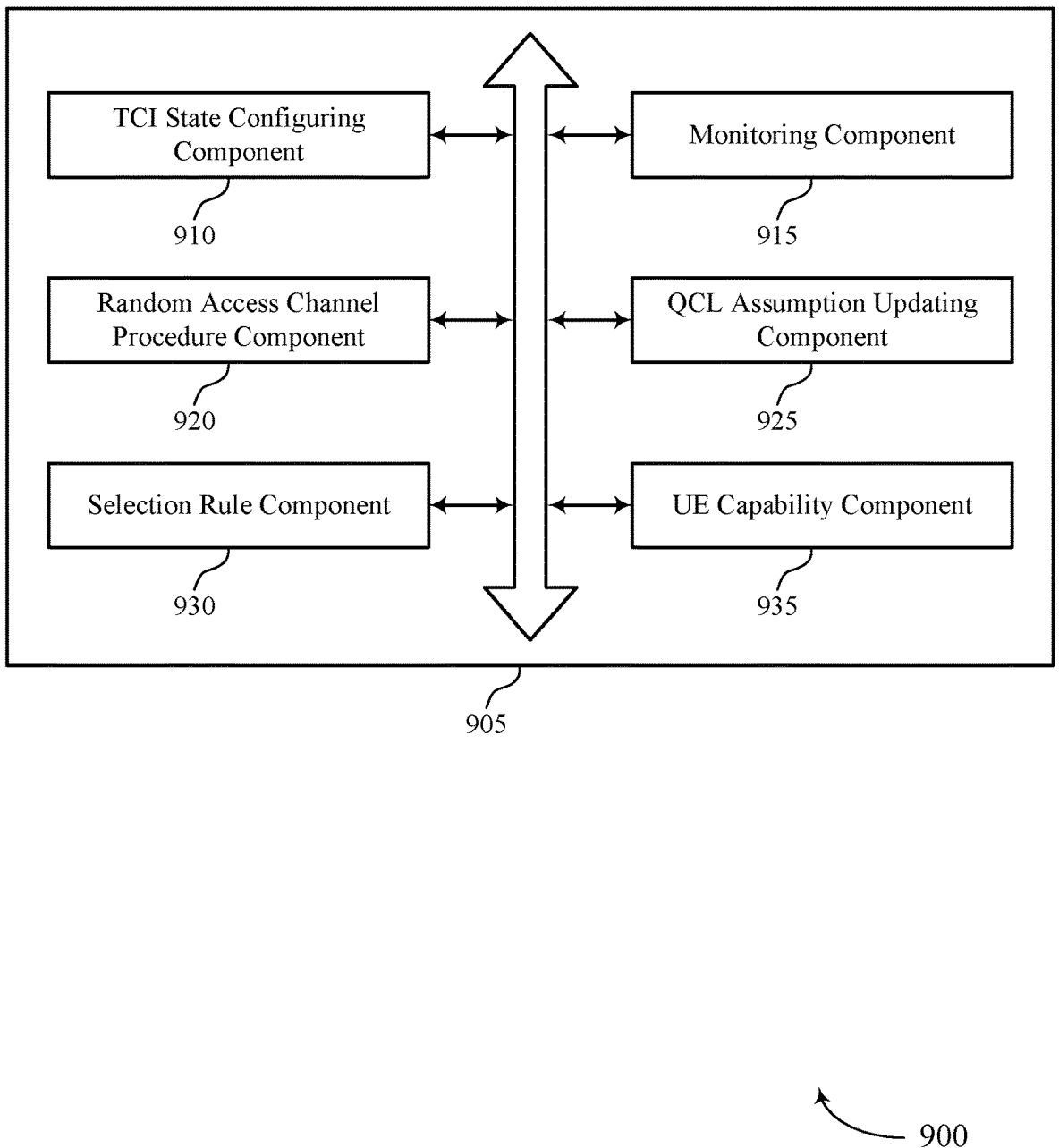
FIG. 9 shows a block diagram of a communications manager in accordance with aspects of the present disclosure.

FIG. 9 shows a block diagram 900 of a communications manager 905 in accordance with aspects of the present disclosure. The communications manager 905 may be an example of aspects of a communications manager 715, a communications manager 815, or a communications manager 1010 described herein. The communications manager 905 may include a TCI state configuring component 910, a monitoring component 915, a random access channel procedure component 920, a QCL assumption updating component 925, a selection rule component 930, and a UE capability component 935. Each of these modules may communicate, directly or indirectly, with one another (e.g., via one or more buses).

The TCI state configuring component 910 may receive configuration signaling configuring a first active transmission configuration indication state for an initial control resource set and a second active transmission configuration indication state for a second control resource set. In some examples, the TCI state configuring component 910 may receive a MAC CE indicating to apply the first active transmission configuration indication state or the second active transmission configuration indication state as an active transmission configuration indication state for the shared data channel. In some examples, the TCI state configuring component 910 may receive the configuration signaling that indicates an active transmission configuration indication state for the shared data channel is to follow the first active transmission configuration indication state for the initial control resource set. In some examples, the TCI state configuring component 910 may receive the configuration signaling that indicates that an active transmission configuration indication state for the shared data channel is to follow the second active transmission configuration indication state for the second control resource set.

The monitoring component 915 may monitor the initial control resource set using a first beam corresponding to the first active transmission configuration indication state, the second control resource set using a second beam corresponding to the second active transmission configuration indication state, and a shared data channel using one of the first beam or the second beam. In some examples, the monitoring component 915 may monitor the shared data channel using the selected beam. In some examples, the monitoring component 915 may monitor the initial control resource set, the shared data channel, or both, using a fourth beam that corresponds to the third active transmission configuration indication state. In some examples, the monitoring component 915 may monitor the initial control resource set using a fourth beam that corresponds to the third active transmission configuration indication state, where monitoring of the shared data channel uses the second beam.

The random access channel procedure component 920 may perform a random access channel procedure to select a third beam from a set of different beams. In some examples, the random access channel procedure component 920 may generate a set of reference signal measurements that each correspond to a respective beam of the set of different beams. In some examples, the random access channel procedure component 920 may select the third beam based on the set of reference signal measurements.

The QCL assumption updating component 925 may update a quasi co-location assumption for the initial control resource set to correspond to the third beam. The selection rule component 930 may apply a selection rule for selecting between the second beam and the third beam. In some examples, the selection rule component 930 may select the third beam by configuring a quasi co-location assumption for the shared data channel to follow the updated quasi co-location assumption for the initial control resource set. In some examples, the selection rule component 930 may receive second configuration signaling configuring a third active transmission configuration indication state for the initial control resource set.

In some examples, the selection rule component 930 may monitor the initial control resource set, the shared data channel, or both, using a fourth beam that corresponds to the third active transmission configuration indication state. In some examples, the selection rule component 930 may select the second beam by configuring or updating an active transmission configuration indication state for the shared data channel to follow the second active transmission configuration indication state for the second control resource set. In some examples, the selection rule component 930 may receive second configuration signaling configuring a third active transmission configuration indication state for the initial control resource set.

In some examples, the selection rule component 930 may receive control signaling that configures the selection rule. In some cases, the selection rule indicates to select the third beam based on an active transmission configuration indication state for the shared data channel following the first active transmission configuration indication state for the initial control resource set prior to updating the quasi co-location assumption. In some cases, the selection rule indicates to select the second beam based on an active transmission configuration indication state for the shared data channel following the first active transmission configuration indication state for the initial control resource set prior to updating the quasi co-location assumption. In some cases, the selection rule component 930 may configure, based on applying the selection rule for selecting between the second beam and the third beam, a receiver or a transmitter to use the selected beam.

The UE capability component 935 may transmit capability signaling indicating that the UE supports two active transmission configuration indication states, where the configuration signaling is based on the support signaling. In some examples, the UE capability component 935 may both of the two active transmission configuration indication states are configured to be used for a downlink control channel, and one of the two active transmission configuration indication states is configured to be used for a downlink shared data channel.

Figure 10:
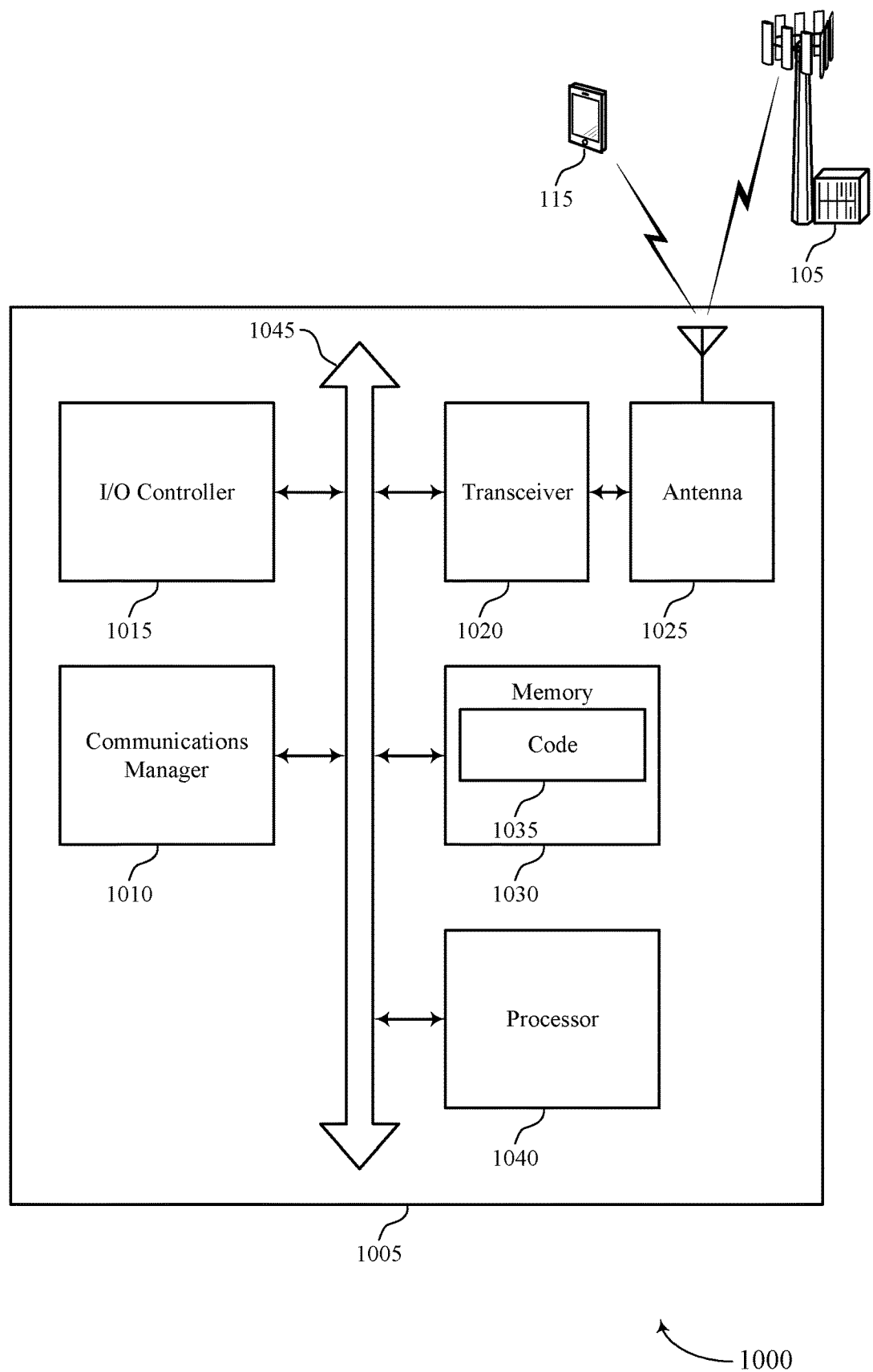
FIG. 10 shows a diagram of a system including a device in accordance with aspects of the present disclosure.

FIG. 10 shows a diagram of a system 1000 including a device 1005 in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive configuration signaling configuring a first active transmission configuration indication state for an initial control resource set and a second active transmission configuration indication state for a second control resource set, monitor the initial control resource set using a first beam corresponding to the first active transmission configuration indication state, the second control resource set using a second beam corresponding to the second active transmission configuration indication state, and a shared data channel using one of the first beam or the second beam, monitor the shared data channel using the selected beam, perform a random access channel procedure to select a third beam from a set of different beams, update a quasi co-location assumption for the initial control resource set to correspond to the third beam, and apply a selection rule for selecting between the second beam and the third beam.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission configuration indication determination for a shared data channel).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
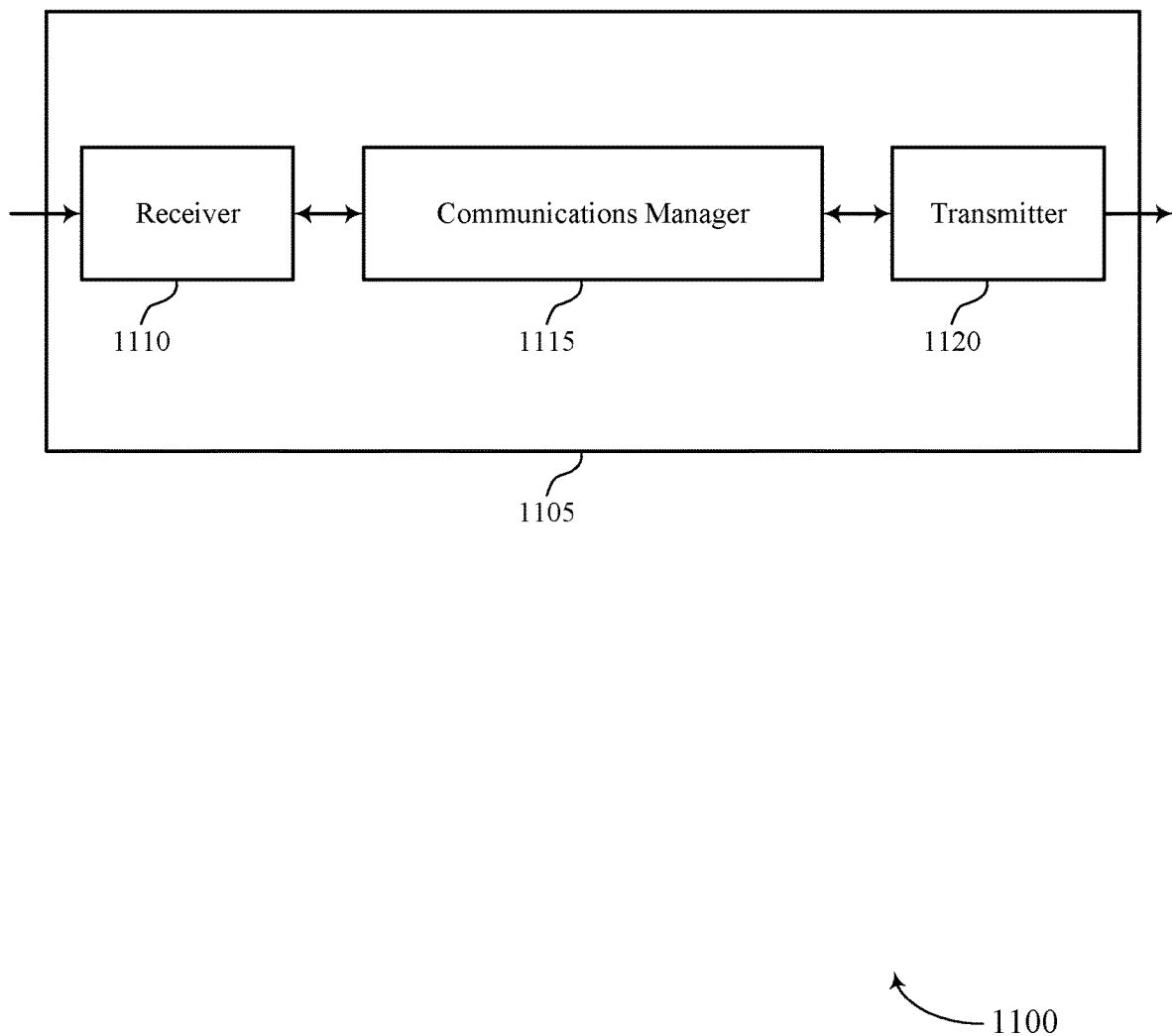
FIGS. 11 and 12 show block diagrams of devices that support transmission configuration indication determination for a shared data channel in accordance with aspects of the present disclosure.

FIG. 11 shows a block diagram 1100 of a device 1105 in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmission configuration indication determination for a shared data channel, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit configuration signaling configuring a UE with a first active transmission configuration indication state corresponding to a first beam for an initial control resource set and a second active transmission configuration indication state corresponding to a second beam for a second control resource set, perform a random access channel procedure to select a third beam from a set of different beams, update a quasi co-location assumption for the initial control resource set to correspond to the third beam, apply a selection rule for selecting between the second beam and the third beam, and transmit a data transmission within a shared data channel using the selected beam. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
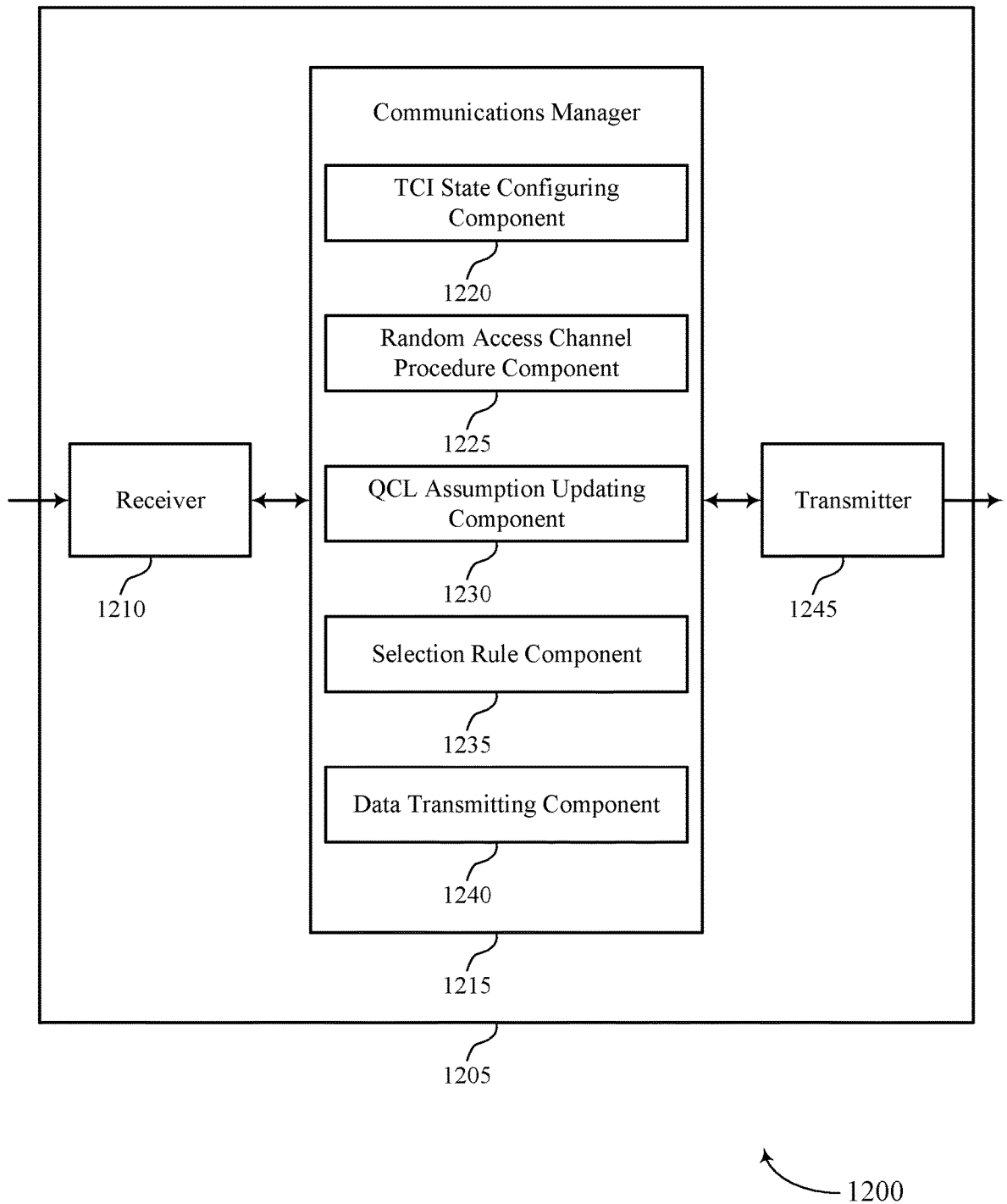

FIG. 12 shows a block diagram 1200 of a device 1205 in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to transmission configuration indication determination for a shared data channel, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a TCI state configuring component 1220, a random access channel procedure component 1225, a QCL assumption updating component 1230, a selection rule component 1235, and a data transmitting component 1240. The communications manager 1215 may be an example of aspects of the communications manager 1410 described herein.

The TCI state configuring component 1220 may transmit configuration signaling configuring a UE with a first active transmission configuration indication state corresponding to a first beam for an initial control resource set and a second active transmission configuration indication state corresponding to a second beam for a second control resource set. The random access channel procedure component 1225 may perform a random access channel procedure to select a third beam from a set of different beams. The QCL assumption updating component 1230 may update a quasi co-location assumption for the initial control resource set to correspond to the third beam. The selection rule component 1235 may apply a selection rule for selecting between the second beam and the third beam. The data transmitting component 1240 may transmit a data transmission within a shared data channel using the selected beam.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
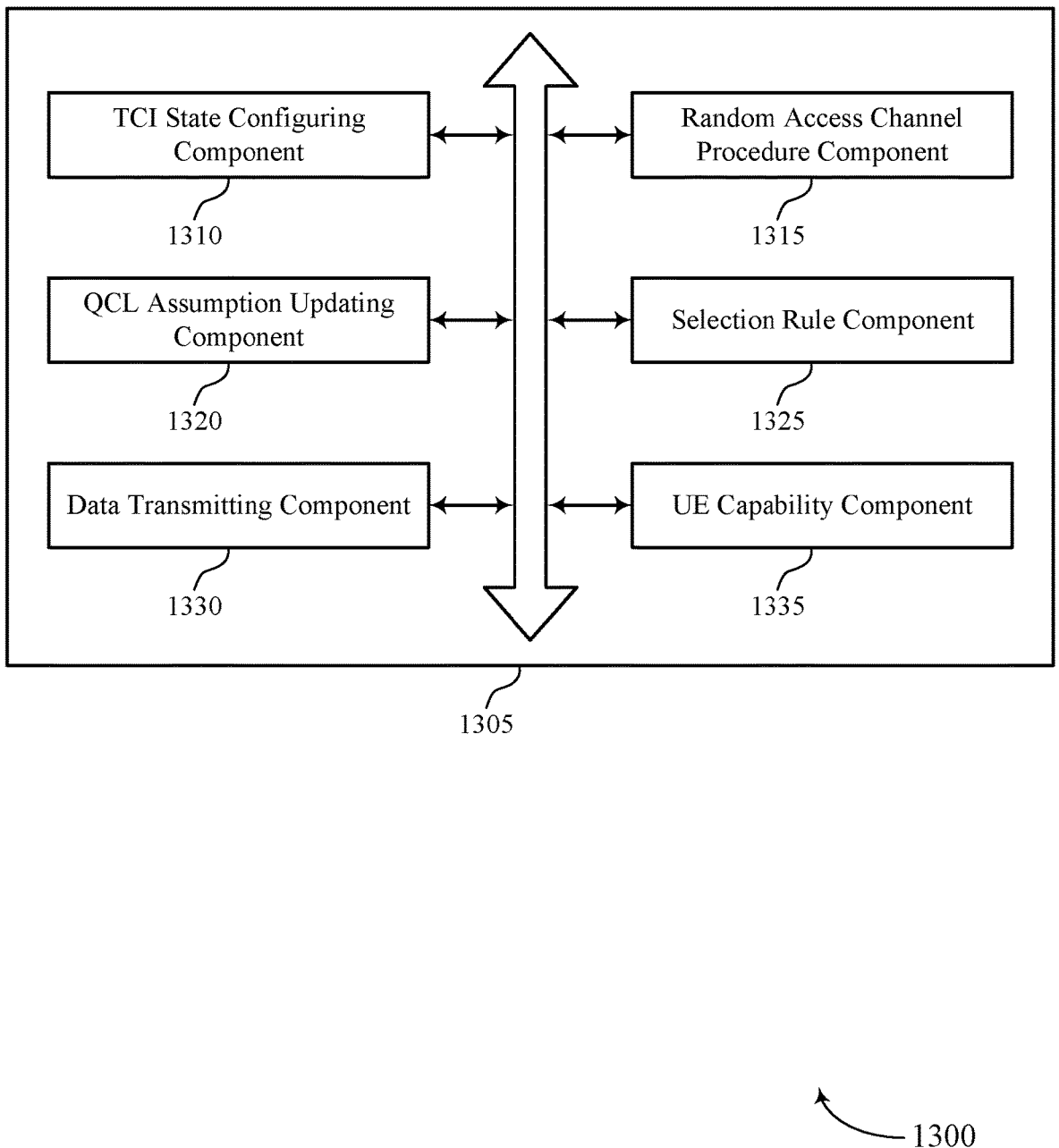
FIG. 13 shows a block diagram of a communications manager in accordance with aspects of the present disclosure.

FIG. 13 shows a block diagram 1300 of a communications manager 1305 in accordance with aspects of the present disclosure. The communications manager 1305 may be an example of aspects of a communications manager 1115, a communications manager 1215, or a communications manager 1410 described herein. The communications manager 1305 may include a TCI state configuring component 1310, a random access channel procedure component 1315, a QCL assumption updating component 1320, a selection rule component 1325, a data transmitting component 1330, and a UE capability component 1335. Each of these modules may communicate, directly or indirectly, with one another (e.g., via one or more buses).

The TCI state configuring component 1310 may transmit configuration signaling configuring a UE with a first active transmission configuration indication state corresponding to a first beam for an initial control resource set and a second active transmission configuration indication state corresponding to a second beam for a second control resource set. In some examples, the TCI state configuring component 1310 may transmit a MAC CE indicating to apply the first active transmission configuration indication state or the second active transmission configuration indication state as an active transmission configuration indication state for the shared data channel. In some examples, the TCI state configuring component 1310 may transmit the configuration signaling that indicates an active transmission configuration indication state for the shared data channel is to follow the first active transmission configuration indication state for the initial control resource set. In some examples, the TCI state configuring component 1310 may transmit the configuration signaling that indicates that an active transmission configuration indication state for the shared data channel is to follow the second active transmission configuration indication state for the second control resource set.

The random access channel procedure component 1315 may perform a random access channel procedure to select a third beam from a set of different beams. The QCL assumption updating component 1320 may update a quasi co-location assumption for the initial control resource set to correspond to the third beam.

The selection rule component 1325 may apply a selection rule for selecting between the second beam and the third beam. In some examples, the selection rule component 1325 may select the third beam by configuring a quasi co-location assumption for the shared data channel to follow the updated quasi co-location assumption for the initial control resource set. In some examples, the selection rule component 1325 may transmit second configuration signaling configuring a third active transmission configuration indication state for the initial control resource set.

In some examples, the selection rule component 1325 may transmit a transmission within the initial control resource set or the shared data channel using a fourth beam that corresponds to the third active transmission configuration indication state. In some examples, the selection rule component 1325 may select the second beam by updating an active transmission configuration indication state for the shared data channel to follow the second active transmission configuration indication state for the second control resource set. In some examples, the selection rule component 1325 may transmit second configuration signaling configuring a third active transmission configuration indication state for the initial control resource set.

In some examples, the selection rule component 1325 may transmit a transmission within the initial control resource set using a fourth beam that corresponds to the third active transmission configuration indication state, where the data transmission is transmitted using the second beam. In some examples, the selection rule component 1325 may transmit control signaling that configures the selection rule.

In some cases, the selection rule indicates to select the third beam based on an active transmission configuration indication state for the shared data channel following the first active transmission configuration indication state for the initial control resource set prior to updating the quasi co-location assumption. In some cases, the selection rule indicates to select the second beam based on an active transmission configuration indication state for the shared data channel following the first active transmission configuration indication state for the initial control resource set prior to updating the quasi co-location assumption.

The data transmitting component 1330 may transmit a data transmission within a shared data channel using the selected beam. The UE capability component 1335 may receive support capability indicating that the UE supports two active transmission configuration indication states, where the configuration signaling is based on the support signaling. In some examples, the UE capability component 1335 may both of the two active transmission configuration indication states are configured to be used for a downlink control channel, and one of the two active transmission configuration indication states is configured to be used for a downlink shared data channel.

Figure 14:
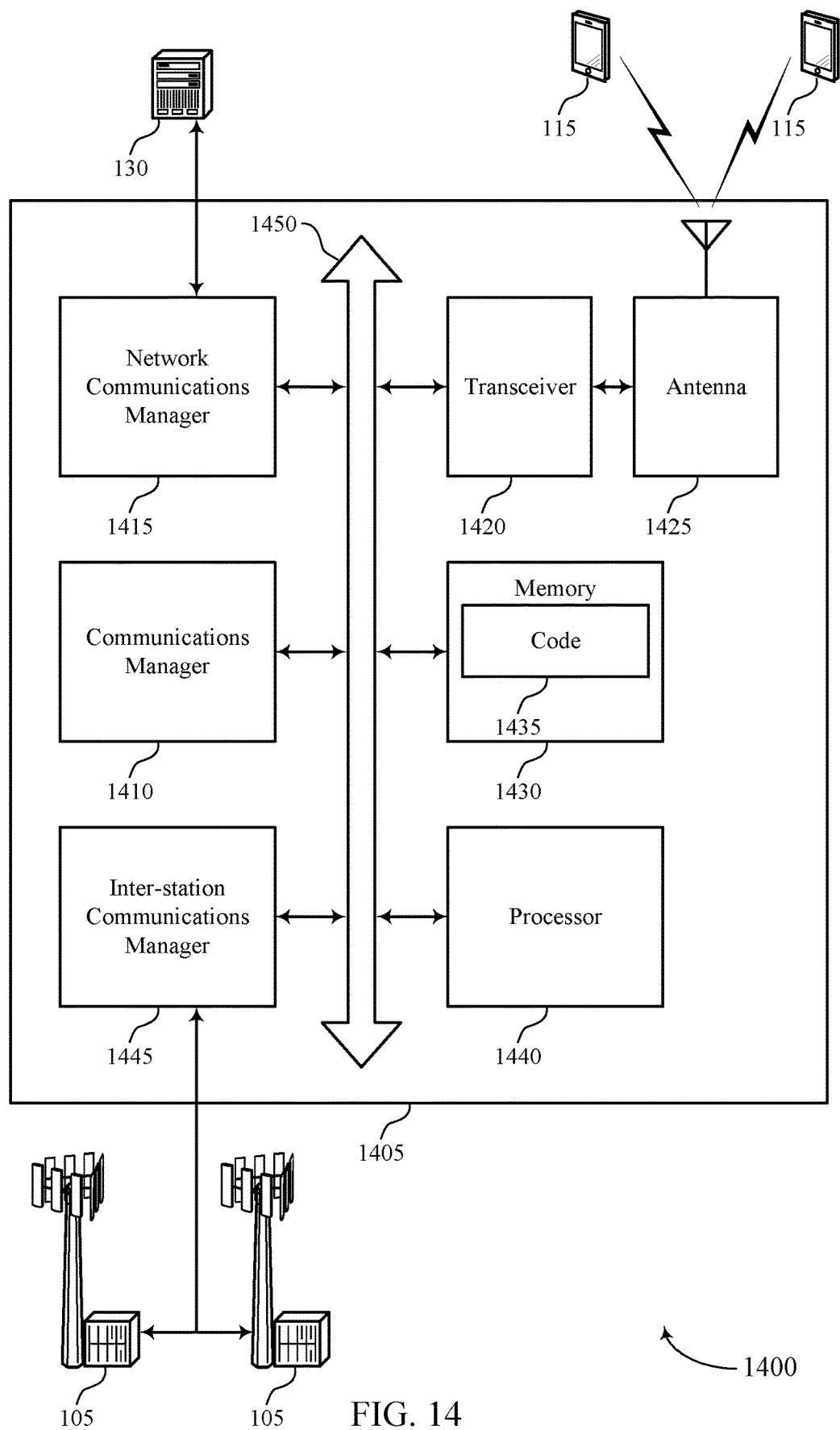
FIG. 14 shows a diagram of a system including a device in accordance with aspects of the present disclosure.

FIG. 14 shows a diagram of a system 1400 including a device 1405 in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit configuration signaling configuring a UE with a first active transmission configuration indication state corresponding to a first beam for an initial control resource set and a second active transmission configuration indication state corresponding to a second beam for a second control resource set, perform a random access channel procedure to select a third beam from a set of different beams, update a quasi co-location assumption for the initial control resource set to correspond to the third beam, apply a selection rule for selecting between the second beam and the third beam, and transmit a data transmission within a shared data channel using the selected beam.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmission configuration indication determination for a shared data channel).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
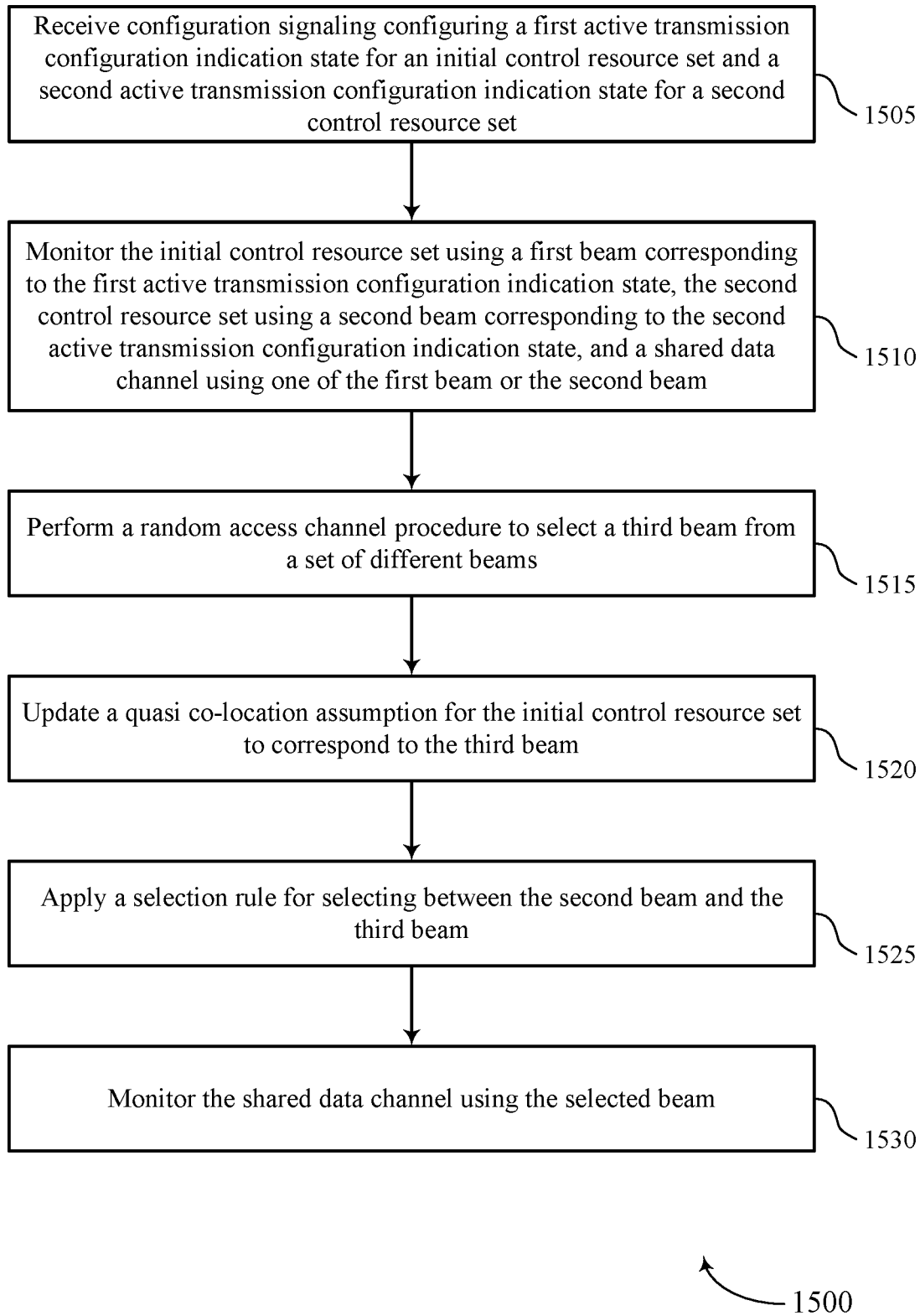
FIGS. 15 through 17 show flowcharts illustrating methods that support transmission configuration indication determination for a shared data channel in accordance with aspects of the present disclosure.

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive configuration signaling configuring a first active transmission configuration indication state for an initial control resource set and a second active transmission configuration indication state for a second control resource set. The operations of 1505 may be performed according to the methods described herein. In some examples, aspects of the operations of 1505 may be performed by a TCI state configuring component as described with reference to FIGS. 7 through 10.

At 1510, the UE may monitor the initial control resource set using a first beam corresponding to the first active transmission configuration indication state, the second control resource set using a second beam corresponding to the second active transmission configuration indication state, and a shared data channel using one of the first beam or the second beam. The operations of 1510 may be performed according to the methods described herein. In some examples, aspects of the operations of 1510 may be performed by a monitoring component as described with reference to FIGS. 7 through 10.

At 1515, the UE may perform a random access channel procedure to select a third beam from a set of different beams. The operations of 1515 may be performed according to the methods described herein. In some examples, aspects of the operations of 1515 may be performed by a random access channel procedure component as described with reference to FIGS. 7 through 10.

At 1520, the UE may update a quasi co-location assumption for the initial control resource set to correspond to the third beam. The operations of 1520 may be performed according to the methods described herein. In some examples, aspects of the operations of 1520 may be performed by a QCL assumption updating component as described with reference to FIGS. 7 through 10.

At 1525, the UE may apply a selection rule for selecting between the second beam and the third beam. The operations of 1525 may be performed according to the methods described herein. In some examples, aspects of the operations of 1525 may be performed by a selection rule component as described with reference to FIGS. 7 through 10.

At 1530, the UE may monitor the shared data channel using the selected beam. The operations of 1530 may be performed according to the methods described herein. In some examples, aspects of the operations of 1530 may be performed by a monitoring component as described with reference to FIGS. 7 through 10.

Figure 16:
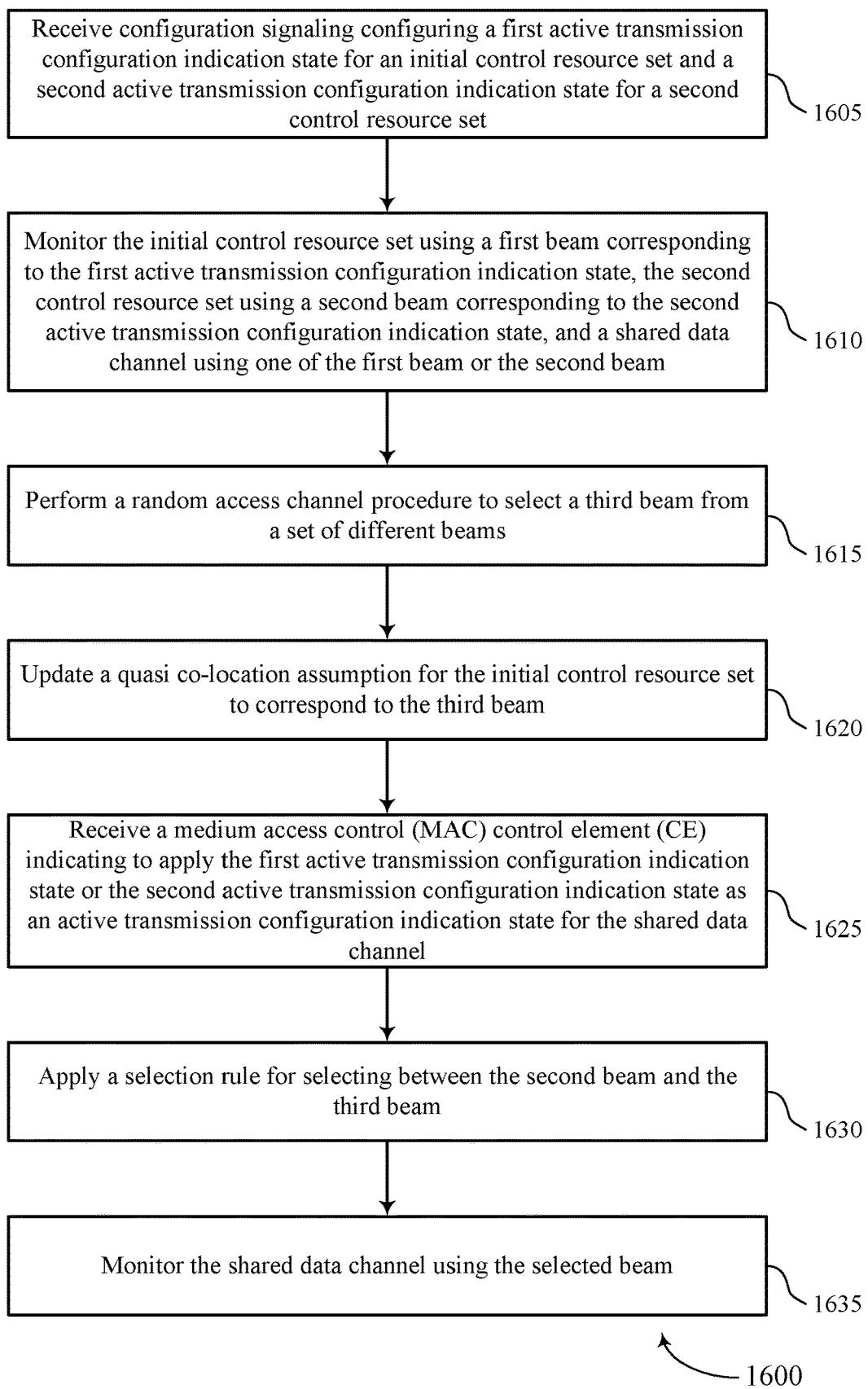

FIG. 16 shows a flowchart illustrating a method 1600 in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive configuration signaling configuring a first active transmission configuration indication state for an initial control resource set and a second active transmission configuration indication state for a second control resource set. The operations of 1605 may be performed according to the methods described herein. In some examples, aspects of the operations of 1605 may be performed by a TCI state configuring component as described with reference to FIGS. 7 through 10.

At 1610, the UE may monitor the initial control resource set using a first beam corresponding to the first active transmission configuration indication state, the second control resource set using a second beam corresponding to the second active transmission configuration indication state, and a shared data channel using one of the first beam or the second beam. The operations of 1610 may be performed according to the methods described herein. In some examples, aspects of the operations of 1610 may be performed by a monitoring component as described with reference to FIGS. 7 through 10.

At 1615, the UE may perform a random access channel procedure to select a third beam from a set of different beams. The operations of 1615 may be performed according to the methods described herein. In some examples, aspects of the operations of 1615 may be performed by a random access channel procedure component as described with reference to FIGS. 7 through 10.

At 1620, the UE may update a quasi co-location assumption for the initial control resource set to correspond to the third beam. The operations of 1620 may be performed according to the methods described herein. In some examples, aspects of the operations of 1620 may be performed by a QCL assumption updating component as described with reference to FIGS. 7 through 10.

At 1625, the UE may receive a MAC CE indicating to apply the first active transmission configuration indication state or the second active transmission configuration indication state as an active transmission configuration indication state for the shared data channel. The operations of 1625 may be performed according to the methods described herein. In some examples, aspects of the operations of 1625 may be performed by a TCI state configuring component as described with reference to FIGS. 7 through 10.

At 1630, the UE may apply a selection rule for selecting between the second beam and the third beam. The operations of 1630 may be performed according to the methods described herein. In some examples, aspects of the operations of 1630 may be performed by a selection rule component as described with reference to FIGS. 7 through 10.

At 1635, the UE may monitor the shared data channel using the selected beam. The operations of 1635 may be performed according to the methods described herein. In some examples, aspects of the operations of 1635 may be performed by a monitoring component as described with reference to FIGS. 7 through 10.

Figure 17:
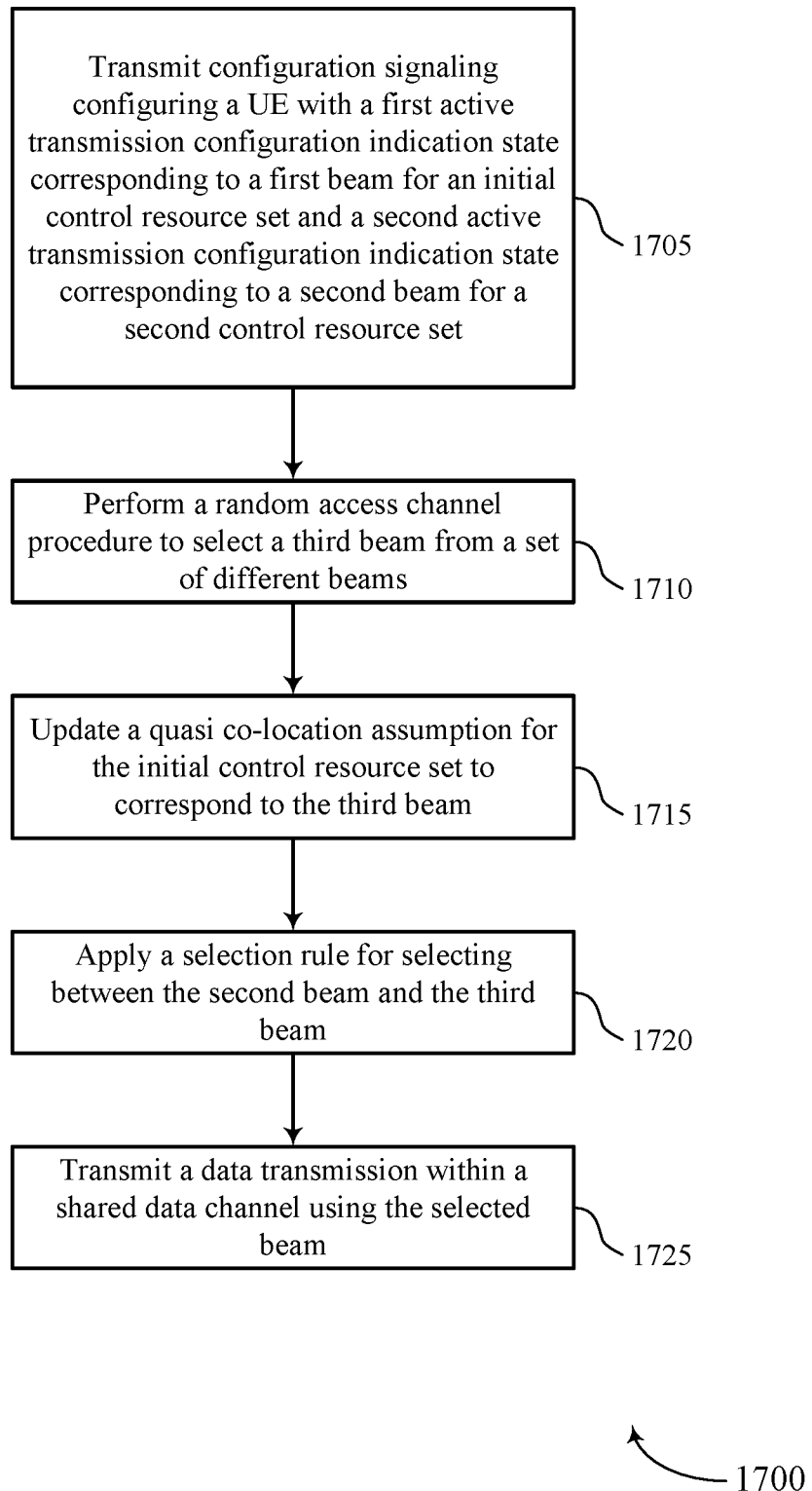

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit configuration signaling configuring a UE with a first active transmission configuration indication state corresponding to a first beam for an initial control resource set and a second active transmission configuration indication state corresponding to a second beam for a second control resource set. The operations of 1705 may be performed according to the methods described herein. In some examples, aspects of the operations of 1705 may be performed by a TCI state configuring component as described with reference to FIGS. 11 through 14.

At 1710, the base station may perform a random access channel procedure to select a third beam from a set of different beams. The operations of 1710 may be performed according to the methods described herein. In some examples, aspects of the operations of 1710 may be performed by a random access channel procedure component as described with reference to FIGS. 11 through 14.

At 1715, the base station may update a quasi co-location assumption for the initial control resource set to correspond to the third beam. The operations of 1715 may be performed according to the methods described herein. In some examples, aspects of the operations of 1715 may be performed by a QCL assumption updating component as described with reference to FIGS. 11 through 14.

At 1720, the base station may apply a selection rule for selecting between the second beam and the third beam. The operations of 1720 may be performed according to the methods described herein. In some examples, aspects of the operations of 1720 may be performed by a selection rule component as described with reference to FIGS. 11 through 14.

At 1725, the base station may transmit a data transmission within a shared data channel using the selected beam. The operations of 1725 may be performed according to the methods described herein. In some examples, aspects of the operations of 1725 may be performed by a data transmitting component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving configuration signaling configuring a first active transmission configuration indication state for an initial control resource set and a second active transmission configuration indication state for a second control resource set;
   monitoring the initial control resource set using a first beam corresponding to the first active transmission configuration indication state, the second control resource set using a second beam corresponding to the second active transmission configuration indication state, and a shared data channel using one of the first beam or the second beam;
   performing a random access channel procedure to select a third beam from a plurality of different beams;
   updating a quasi co-location assumption for the initial control resource set to correspond to the third beam;
   applying a selection rule for selecting between the second beam and the third beam; and
   monitoring the shared data channel using the selected beam.

2. The method of claim 1, wherein applying the selection rule further comprises:
   selecting the second beam by updating an active transmission configuration indication state for the shared data channel to follow the second active transmission configuration indication state for the second control resource set.

3. The method of claim 1, further comprising:
   receiving second configuration signaling configuring a third active transmission configuration indication state for the initial control resource set.

4. The method of claim 3, further comprising:
   monitoring the initial control resource set, the shared data channel, or both, using a fourth beam that corresponds to the third active transmission configuration indication state.

5. The method of claim 3, further comprising:
   monitoring the initial control resource set using a fourth beam that corresponds to the third active transmission configuration indication state, wherein monitoring of the shared data channel uses the second beam.

6. The method of claim 1, wherein the selection rule indicates to select the third beam based at least in part on an active transmission configuration indication state for the shared data channel following the first active transmission configuration indication state for the initial control resource set prior to updating the quasi co-location assumption.

7. The method of claim 6, wherein applying the selection rule further comprises:
   selecting the third beam by configuring a quasi co-location assumption for the shared data channel to follow the updated quasi co-location assumption for the initial control resource set.

8. The method of claim 6, further comprising:
   receiving second configuration signaling configuring a third active transmission configuration indication state for the initial control resource set; and
   monitoring the initial control resource set, the shared data channel, or both, using a fourth beam that corresponds to the third active transmission configuration indication state.

9. The method of claim 1, wherein receiving the configuration signaling further comprises:
   receiving a medium access control (MAC) control element (CE) indicating to apply the first active transmission configuration indication state or the second active transmission configuration indication state as an active transmission configuration indication state for the shared data channel.

10. The method of claim 1, wherein applying the selection rule further comprises:
    selecting the second beam by configuring an active transmission configuration indication state for the shared data channel to follow the second active transmission configuration indication state for the second control resource set.

11. The method of claim 1, wherein the selection rule indicates to select the second beam based at least in part on an active transmission configuration indication state for the shared data channel following the first active transmission configuration indication state for the initial control resource set prior to updating the quasi co-location assumption.

12. The method of claim 1, further comprising:
    receiving control signaling that configures the selection rule.

13. The method of claim 1, wherein receiving the configuration signaling further comprises:
    receiving the configuration signaling that indicates an active transmission configuration indication state for the shared data channel is to follow the first active transmission configuration indication state for the initial control resource set.

14. The method of claim 1, wherein receiving the configuration signaling further comprises:
    receiving the configuration signaling that indicates that an active transmission configuration indication state for the shared data channel is to follow the second active transmission configuration indication state for the second control resource set.

15. The method of claim 1, further comprising:
    transmitting capability signaling indicating that the UE supports two active transmission configuration indication states, where the configuration signaling is based at least in part on the support signaling.

16. The method of claim 15, wherein:
    both of the two active transmission configuration indication states are configured to be used for a downlink control channel, and one of the two active transmission configuration indication states is configured to be used for a downlink shared data channel.

17. The method of claim 1, wherein performing the random access channel procedure to select the third beam further comprises:
    generating a plurality of reference signal measurements that each correspond to a respective beam of the plurality of different beams; and
    selecting the third beam based at least in part on the plurality of reference signal measurements.

18. A method for wireless communication by a base station, comprising:
    transmitting configuration signaling configuring a user equipment (UE) with a first active transmission configuration indication state corresponding to a first beam for an initial control resource set and a second active transmission configuration indication state corresponding to a second beam for a second control resource set;
performing a random access channel procedure to select a third beam from a plurality of different beams;
updating a quasi co-location assumption for the initial control resource set to correspond to the third beam;
applying a selection rule for selecting between the second beam and the third beam; and
transmitting a data transmission within a shared data channel using the selected beam.

19. The method of claim 18, wherein applying the selection rule further comprises:
selecting the second beam by updating an active transmission configuration indication state for the shared data channel to follow the second active transmission configuration indication state for the second control resource set.

20. The method of claim 18, further comprising:
transmitting second configuration signaling configuring a third active transmission configuration indication state for the initial control resource set.

21. The method of claim 20, further comprising:
transmitting a transmission within the initial control resource set or the shared data channel using a fourth beam that corresponds to the third active transmission configuration indication state.

22. The method of claim 20, further comprising:
transmitting a transmission within the initial control resource set using a fourth beam that corresponds to the third active transmission configuration indication state, wherein the data transmission is transmitted using the second beam.

23. The method of claim 18, wherein the selection rule indicates to select the third beam based at least in part on an active transmission configuration indication state for the shared data channel following the first active transmission configuration indication state for the initial control resource set prior to updating the quasi co-location assumption.

24. The method of claim 23, wherein applying the selection rule further comprises:
selecting the third beam by configuring a quasi co-location assumption for the shared data channel to follow the updated quasi co-location assumption for the initial control resource set.

25. The method of claim 23, further comprising:
transmitting second configuration signaling configuring a third active transmission configuration indication state for the initial control resource set; and
transmitting a transmission within the initial control resource set or the shared data channel using a fourth beam that corresponds to the third active transmission configuration indication state.

26. The method of claim 18, wherein transmitting the configuration signaling further comprises:
transmitting a medium access control (MAC) control element (CE) indicating to apply the first active transmission configuration indication state or the second active transmission configuration indication state as an active transmission configuration indication state for the shared data channel.

27. The method of claim 18, wherein applying the selection rule further comprises:
selecting the second beam by configuring an active transmission configuration indication state for the shared data channel to follow the second active transmission configuration indication state for the second control resource set.

28. The method of claim 18, wherein the selection rule indicates to select the second beam based at least in part on an active transmission configuration indication state for the shared data channel following the first active transmission configuration indication state for the initial control resource set prior to updating the quasi co-location assumption.

29. An apparatus for wireless communication by a user equipment (UE), comprising:
a processor,
memory in electronic communication with the processor; and
instructions stored in the memory and executable by the processor to cause the apparatus to:
receive configuration signaling configuring a first active transmission configuration indication state for an initial control resource set and a second active transmission configuration indication state for a second control resource set;
monitor the initial control resource set using a first beam corresponding to the first active transmission configuration indication state, the second control resource set using a second beam corresponding to the second active transmission configuration indication state, and a shared data channel using one of the first beam or the second beam;
perform a random access channel procedure to select a third beam from a plurality of different beams;
update a quasi co-location assumption for the initial control resource set to correspond to the third beam;
apply a selection rule for selecting between the second beam and the third beam; and
monitor the shared data channel using the selected beam.

30. An apparatus for wireless communication by a base station, comprising:
a processor,
memory in electronic communication with the processor; and
instructions stored in the memory and executable by the processor to cause the apparatus to:
transmit configuration signaling configuring a user equipment (UE) with a first active transmission configuration indication state corresponding to a first beam for an initial control resource set and a second active transmission configuration indication state corresponding to a second beam for a second control resource set;
perform a random access channel procedure to select a third beam from a plurality of different beams;
update a quasi co-location assumption for the initial control resource set to correspond to the third beam;
apply a selection rule for selecting between the second beam and the third beam; and
transmit a data transmission within a shared data channel using the selected beam.

* * * * *